(12) United States Patent
Di Federico et al.

(10) Patent No.: US 9,367,962 B2
(45) Date of Patent: Jun. 14, 2016

(54) AUGMENTED IMAGE DISPLAY USING A CAMERA AND A POSITION AND ORIENTATION SENSOR

(71) Applicant: Topcon Positioning Systems, Inc., Livermore, CA (US)

(72) Inventors: Ivan Giovanni Di Federico, Argenta (IT); Sergey Reytlinger, Moscow (RU); Vyacheslav Lanovets, Moscow (RU); Jason Hallett, Dublin, CA (US)

(73) Assignee: Topcon Positioning Systems, Inc., Livermore, CA (US)

( * ) Notice: Subject to any disclaimer, the term of this patent is extended or adjusted under 35 U.S.C. 154(b) by 72 days.

(21) Appl. No.: 14/510,444

(22) Filed: Oct. 9, 2014

(65) Prior Publication Data

US 2015/0109509 A1     Apr. 23, 2015

Related U.S. Application Data

(60) Provisional application No. 61/893,971, filed on Oct. 22, 2013.

(51) Int. Cl.
  *G06T 19/00*  (2011.01)
  *G01C 11/00*  (2006.01)
  *H04N 5/232*  (2006.01)
  *H04N 5/272*  (2006.01)
  (Continued)

(52) U.S. Cl.
  CPC .............. *G06T 19/006* (2013.01); *G01C 11/00* (2013.01); *G06T 7/0042* (2013.01); *H04N 5/23258* (2013.01); *H04N 5/23293* (2013.01); *G01C 1/04* (2013.01); *G06T 2207/30204* (2013.01); *H04N 5/272* (2013.01)

(58) Field of Classification Search
  CPC ................................... G10C 11/00; G01C 1/04
  See application file for complete search history.

(56) References Cited

U.S. PATENT DOCUMENTS 6,806,905 B1 * 10/2004 Morimoto .............. G01C 11/00
                                                          348/141
7,688,381 B2 *  3/2010 VanBree ................ H04N 5/222
                                                          348/207.11
8,294,814 B2 * 10/2012 VanBree ................ G06T 7/0018
                                                          348/207.11

(Continued)

OTHER PUBLICATIONS

International Search Report and Written Opinion mailed on Jan. 16, 2015, in connection with international patent application No. PCT/US2014/60563, 15 pgs.

(Continued)

*Primary Examiner* — Albert Cutler
(74) *Attorney, Agent, or Firm* — Chiesa Shahinian & Giantomasi PC

(57) ABSTRACT

An augmented image is generated by capturing a visual image of a site with a digital camera, generating a virtual image or associated information from a digital model of the site, and superimposing the virtual image or associated information on the visual image. To register the digital model with the visual image, a sensor pole is introduced into the field of view, and a combined visual image of the site and an optical target on the sensor pole is captured. The position and orientation of the sensor pole with respect to the site reference frame are measured by sensors mounted on the sensor pole; the position and orientation of the digital camera with respect to the sensor pole are calculated from image analysis of the optical target on the sensor pole; and the position and orientation of the digital camera with respect to the site reference frame are calculated.

21 Claims, 35 Drawing Sheets

(51) Int. Cl.
*G06T 7/00* (2006.01)
*G01C 1/04* (2006.01)

(56) References Cited

U.S. PATENT DOCUMENTS

| | | | | |
|---|---|---|---|---|
| 2002/0103617 | A1* | 8/2002 | Uchiyama | G06T 7/0044 702/150 |
| 2003/0014212 | A1 | 1/2003 | Ralston et al. | |
| 2006/0227211 | A1* | 10/2006 | Kotake | G01C 11/00 348/141 |
| 2008/0205707 | A1* | 8/2008 | Braunecker | G01C 1/804 382/106 |
| 2009/0024325 | A1 | 1/2009 | Scherzinger | |
| 2009/0244277 | A1* | 10/2009 | Nagashima | G01C 15/002 348/135 |
| 2011/0105895 | A1 | 5/2011 | Kornblau et al. | |
| 2012/0330601 | A1* | 12/2012 | Soubra | G01C 15/00 702/150 |
| 2013/0162469 | A1* | 6/2013 | Zogg | G01C 15/002 342/357.25 |
| 2013/0278759 | A1* | 10/2013 | Zimmermann | G01C 1/04 348/140 |
| 2014/0081571 | A1* | 3/2014 | Briggs | G01C 15/06 701/491 |
| 2014/0232859 | A1* | 8/2014 | Kotzur | G01C 1/04 348/135 |

OTHER PUBLICATIONS

Keitler et al., "Indirect Tracking to Reduce Occlusion Problems," Dec. 1, 2008, Advances in Visual Computing: 4th International Symposium, ISVC 2008, pp. 224-235.

Satoh et al., "A Head Tracking Method Using Bird's-Eye View Camera and Gyroscope," Nov. 2, 2004, Proceedings of the Third IEEE and ACM International Symposium on Mixed and Augmented Reality, pp. 202-211.

* cited by examiner

VIEW Z-Z'

VIEW A

VIEW B

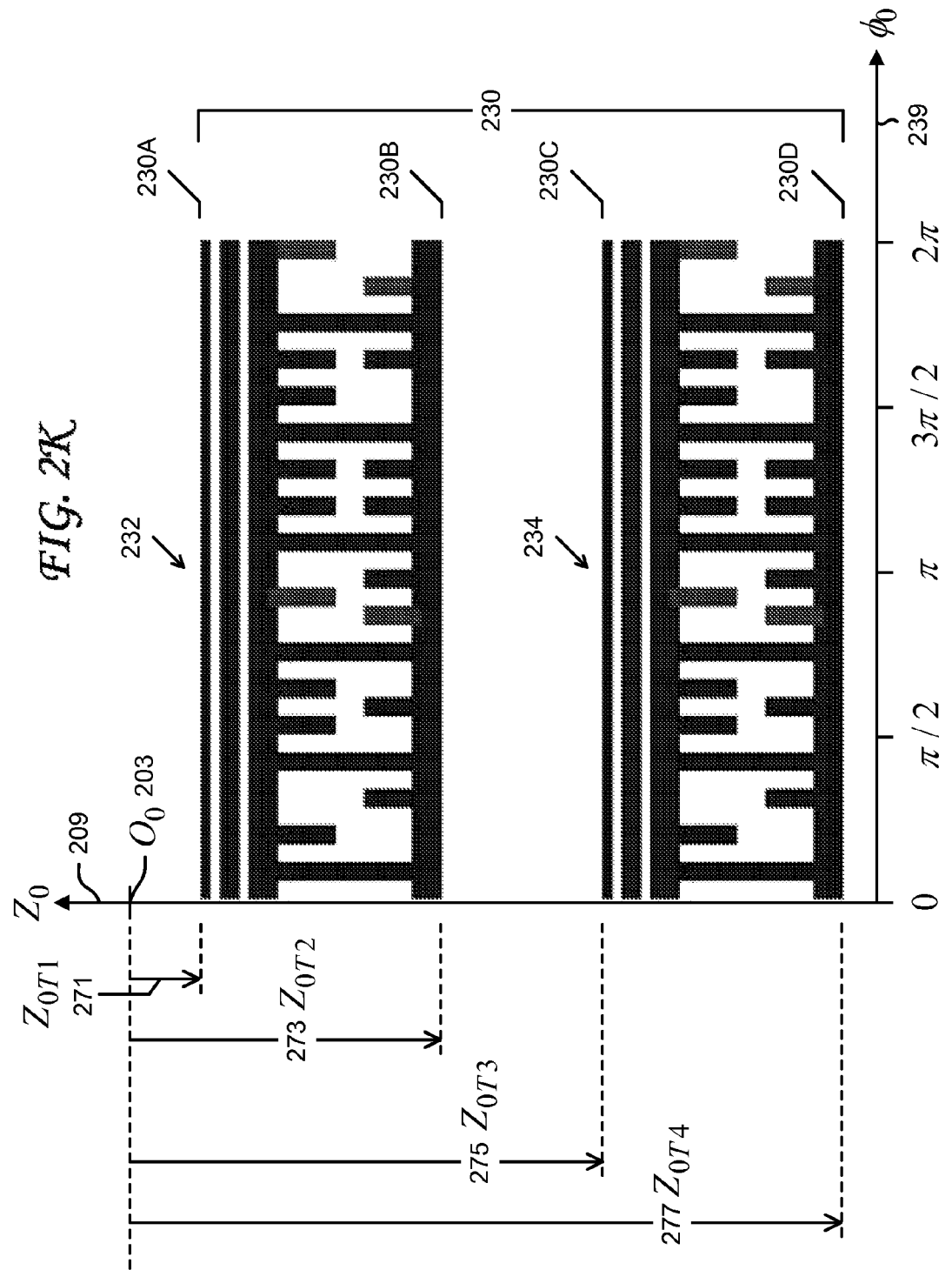

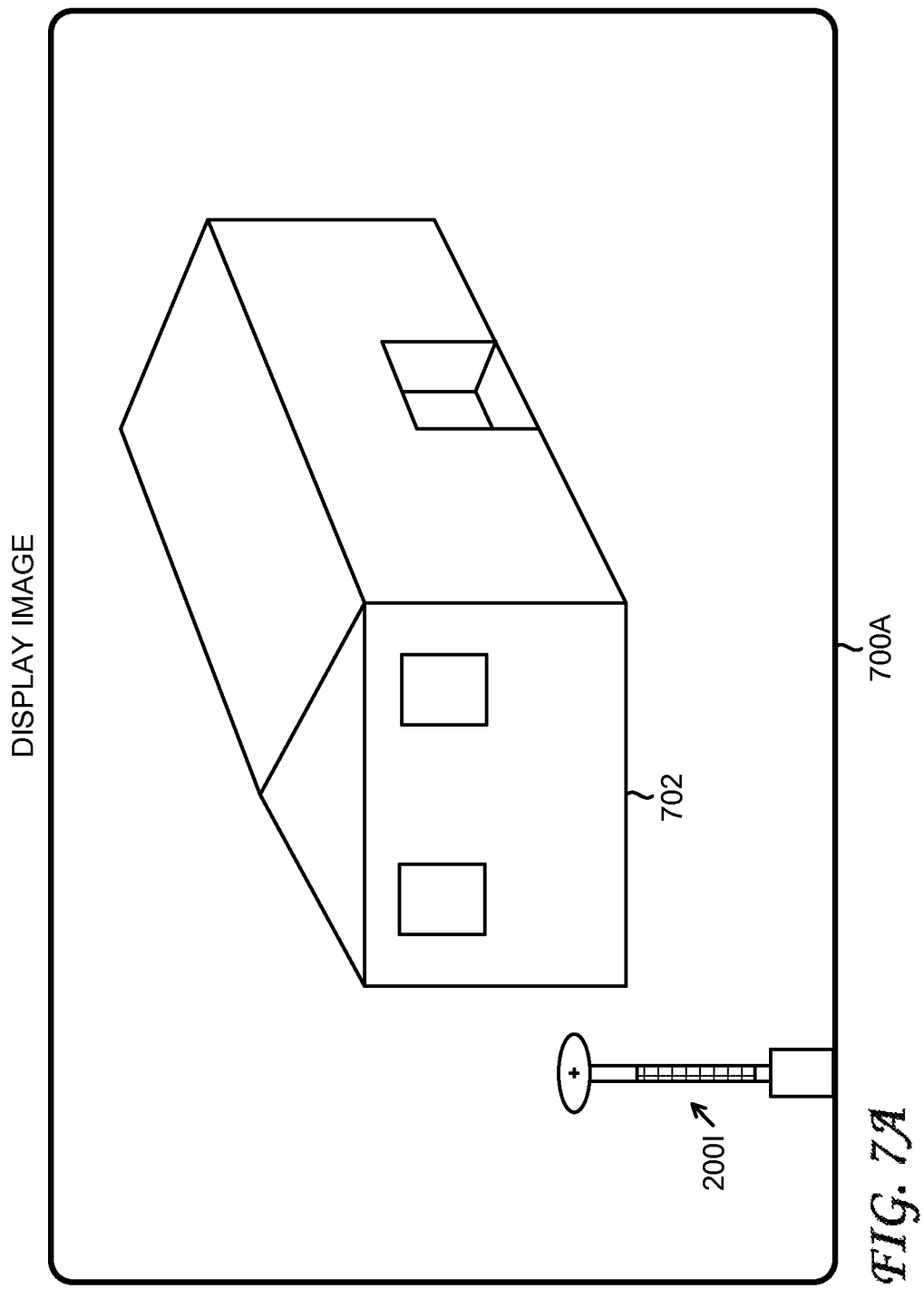

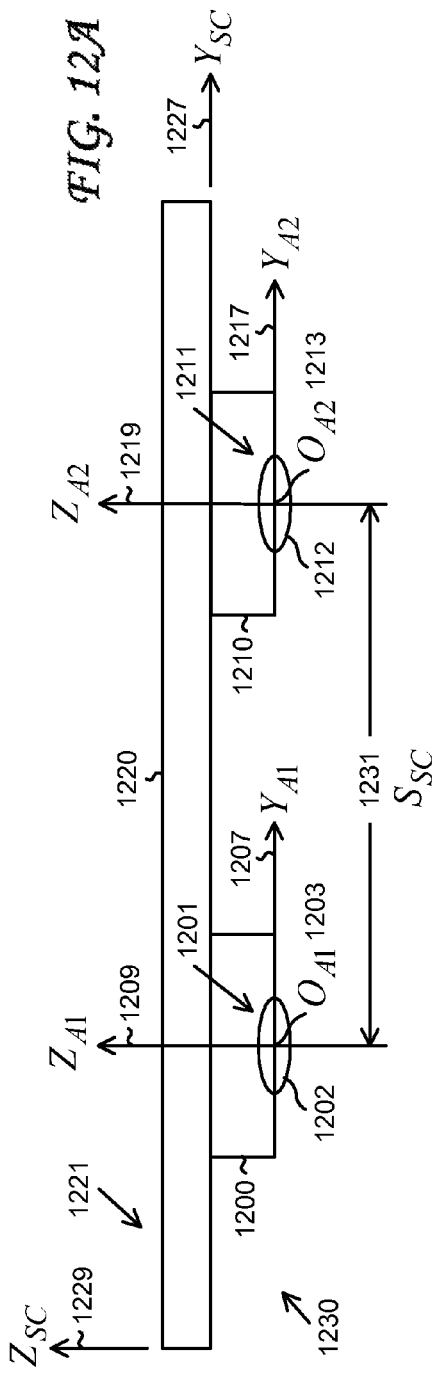
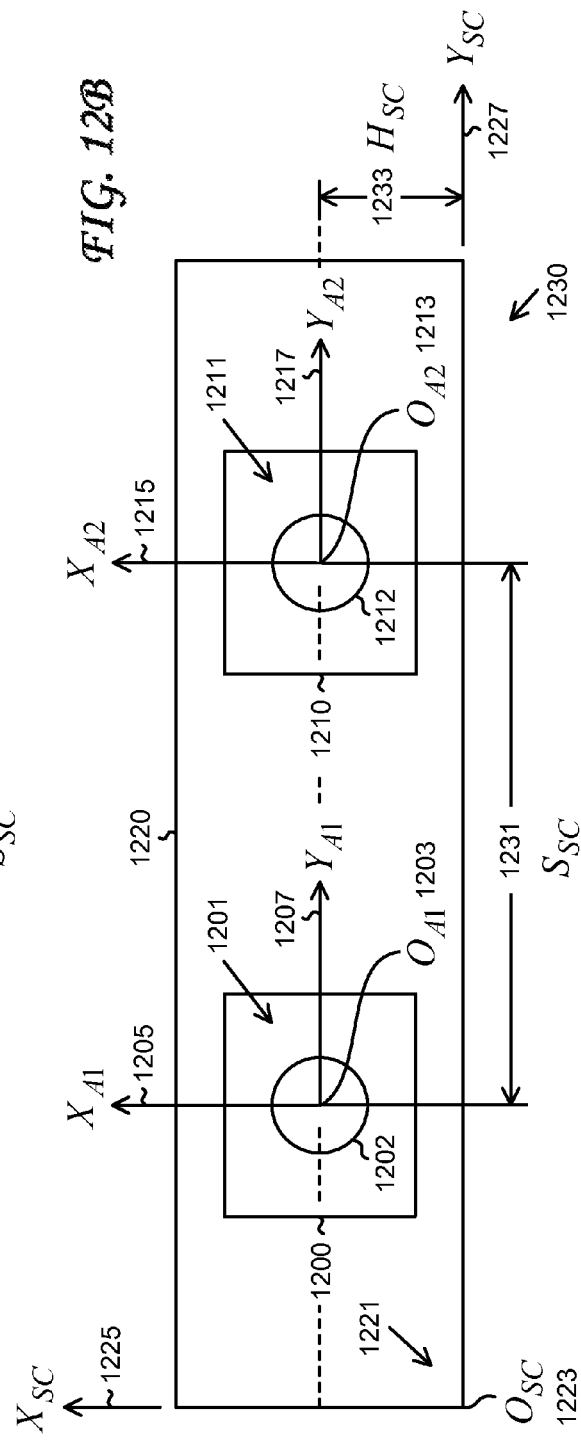

AUGMENTED IMAGE DISPLAY USING A CAMERA AND A POSITION AND ORIENTATION SENSOR

This application claims the benefit of U.S. Provisional Application No. 61/893,971 filed Oct. 22, 2013, which is incorporated herein by reference.

BACKGROUND OF THE INVENTION

The present invention relates generally to digital imaging and, more particularly, to generating augmented images.

Digital cameras have largely supplanted film cameras. A digital camera can capture a visual image in near real time, represent the visual image as data, and store the data in an image data file. The image data file can be processed by software, and the visual image can be displayed on a display. Furthermore, the visual image can be augmented with a computer-generated image or with associated information.

BRIEF SUMMARY OF THE INVENTION

In an embodiment of the invention, an augmented image of a site is generated by the following method. Combined visual image data representing a combined visual image captured with a digital camera is received; the combined visual image data includes site visual image data representing a visual image of the site and optical target visual image data representing a visual image of at least a portion of an optical target disposed on a reference surface of a position and orientation sensor unit.

In the combined visual image data, the optical target visual image data is identified. Based at least in part on the optical target visual image data, the position and orientation of the digital camera relative to the position and orientation sensor unit is calculated. Measurements of the position and orientation of the position and orientation sensor unit relative to a site reference frame are then received. Based at least in part on the position and orientation of the digital camera relative to the position and orientation sensor unit and based at least in part on the position and orientation of the position and orientation sensor unit relative to the site reference frame, the position and orientation of the digital camera relative to the site reference frame are calculated.

Based at least in part on the position and orientation of the digital camera relative to the site reference frame, at least one graphical representation is generated from a digital model of the site. A graphical representation includes a virtual image associated with the site, information associated with the site, or information associated with the virtual image. An augmented image is generated by displaying at least one graphical representation superimposed on a displayed site visual image displaying at least a portion of the visual image of the site or superimposed on a displayed combined visual image displaying at least a portion of the visual image of the site and displaying at least a portion of the visual image of at least a portion of the optical target.

These and other advantages of the invention will be apparent to those of ordinary skill in the art by reference to the following detailed description and the accompanying drawings.

BRIEF DESCRIPTION OF THE DRAWINGS

FIG. 2A-FIG. 2K show schematic diagrams of embodiments of position and orientation sensor units;

FIG. 7A-FIG. 7D show a second sequence of display images;

FIG. 12A and FIG. 12B show schematic diagrams of a stereoscopic camera; and

DETAILED DESCRIPTION

In an embodiment of the invention, a visual image of a site captured by a digital camera is augmented with a virtual image generated from a digital model of the site or with associated information generated from a digital model of the site. The virtual image or associated information is superimposed onto the visual image. Registration of the visual image with the digital model of the site is performed by introducing a position and orientation sensor unit into the field-of-view of the digital camera: the precise position and orientation of the sensor unit relative to the site reference frame are measured; the position and orientation of the digital camera relative to the sensor unit are determined; the position and orientation of the digital camera relative to the site reference frame are determined; and the digital model of the site is mapped to the visual image. To simplify the terminology, a digital camera is referred to below as a camera.

Figure 1:
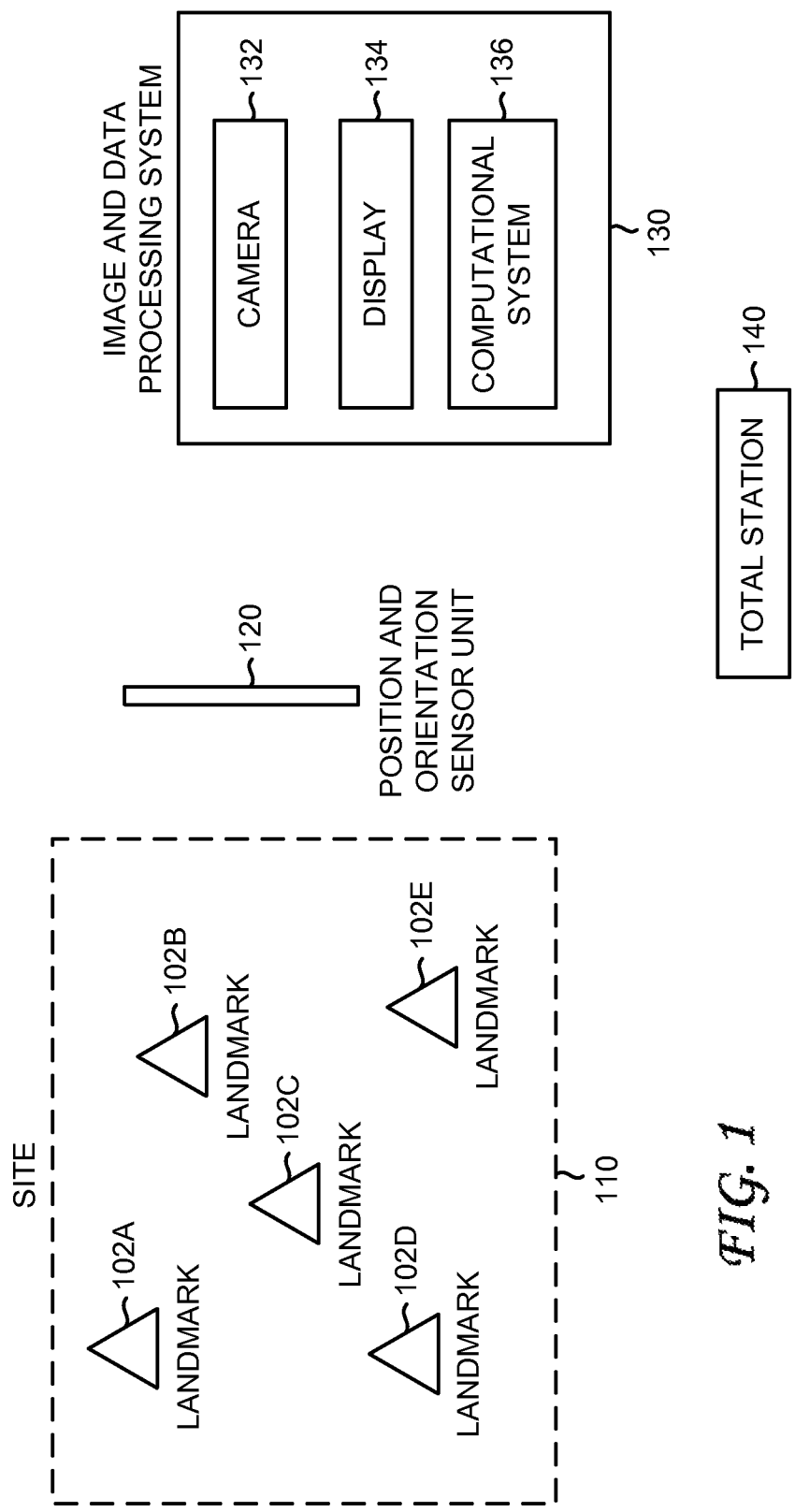
FIG. 1 shows a schematic diagram of an embodiment of a system for generating an augmented image.

FIG. 1 shows an overall schematic illustrating an embodiment of a system for generating an augmented image. The site 110 includes various landmarks (also referred to as objects), represented by triangles; shown are five representative landmarks, referenced as landmark 102A-landmark 102E. Examples of landmarks include natural landmarks (such as trees, rivers, hills, and cliffs) and artificial landmarks (such as buildings, roads, towers, and bridges). A site can also be devoid of distinctive landmarks; for example, a site can be an empty plot of land. Furthermore, a site can refer to an interior location as well as an exterior location; for example, a site can refer to the interior space of a building or a room. Landmarks can refer to parts of the structure such as walls, floors, ceilings, columns, ducts, plumbing, and wiring; furthermore, landmarks can refer to objects such as furniture, machinery, and equipment.

An image and data processing system 130 includes a camera 132, a display 134, and a computational system 136. The camera 132 generates a digital visual image (still or video) of at least a portion of the site 110; the visual image is displayed on the display 134. A position and orientation sensor unit 120 is placed within the field-of-view of the camera 132. A total station 140, which can be a robotic total station, is used in conjunction with some embodiments of the position and orientation sensor unit (described below). One or more position and orientation sensor units can be deployed; and one or more total stations can be deployed.

In FIG. 1, the components of the image and data processing system 130 are shown schematically as three separate components. In practice, the components can be integrated in various configurations. In one embodiment, the camera 132, display 134, and computational system 136 are integrated into a tablet computer or a laptop computer. The camera is forward facing, and the display is backward facing: as the camera is pointed towards the site, the operator (user) views a visual image on the display. In another embodiment, the camera 132, display 134, and computational system 136 are integrated into a head-mounted unit with a heads-up display.

Other embodiments can have one or more cameras, one or more displays, or one or more computational systems in various combinations. For example, a computer with limited memory, limited data storage capacity, and limited processor power mounted on an eyeglass frame can communicate with a tablet or laptop computer with more memory, more data storage capacity, and more processor power. In general, the components can communicate with one another via various interfaces, wired or wireless. To simplify the figures, the interfaces are not shown. Specific embodiments of the position and orientation sensor unit 120 and specific embodiments of the image and data processing system 130 are described below.

Figure 2A:
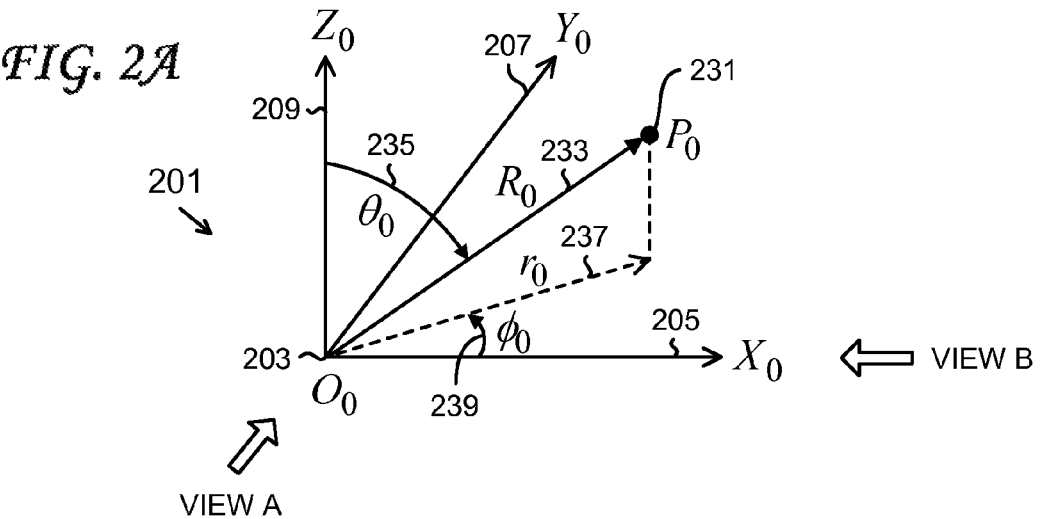

FIG. 2A-FIG. 2D show an embodiment of the position and orientation sensor unit 120, referenced as the sensor pole 200. The geometry of the sensor pole is described with respect to a Cartesian reference frame fixed to the sensor pole. FIG. 2A shows a perspective view of the Cartesian reference frame 201, defined by the origin $O_0$ 203, $X_0$-axis 205, $Y_0$-axis 207, and $Z_0$-axis 209. View A is sighted along the $+Y_0$-axis; View B is sighted along the $-X_0$-axis.

Shown in FIG. 2A is an arbitrary point $P_0$ 231. The vector from the origin $O_0$ to $P_0$ is $R_0$ 233. The projection of $R_0$ onto the $X_0$-$Y_0$ plane is the vector $r_0$ 237. The meridian angle measured from the $Z_0$-axis to the vector $R_0$ is $\theta_0$ 235. The azimuthal angle measured counter-clockwise from the $X_0$-axis to the vector $r_0$ is $\phi_0$ 239.

Figure 2B:
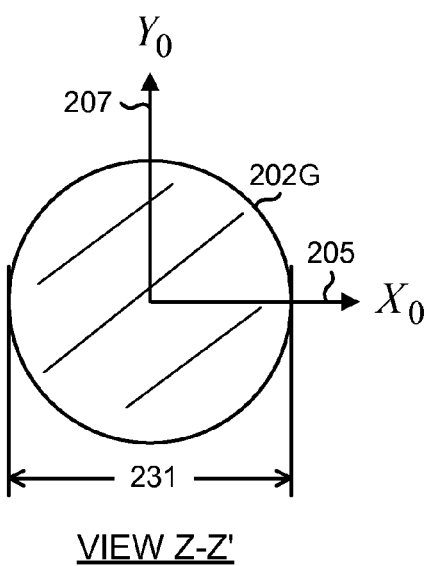
Figure 2C:
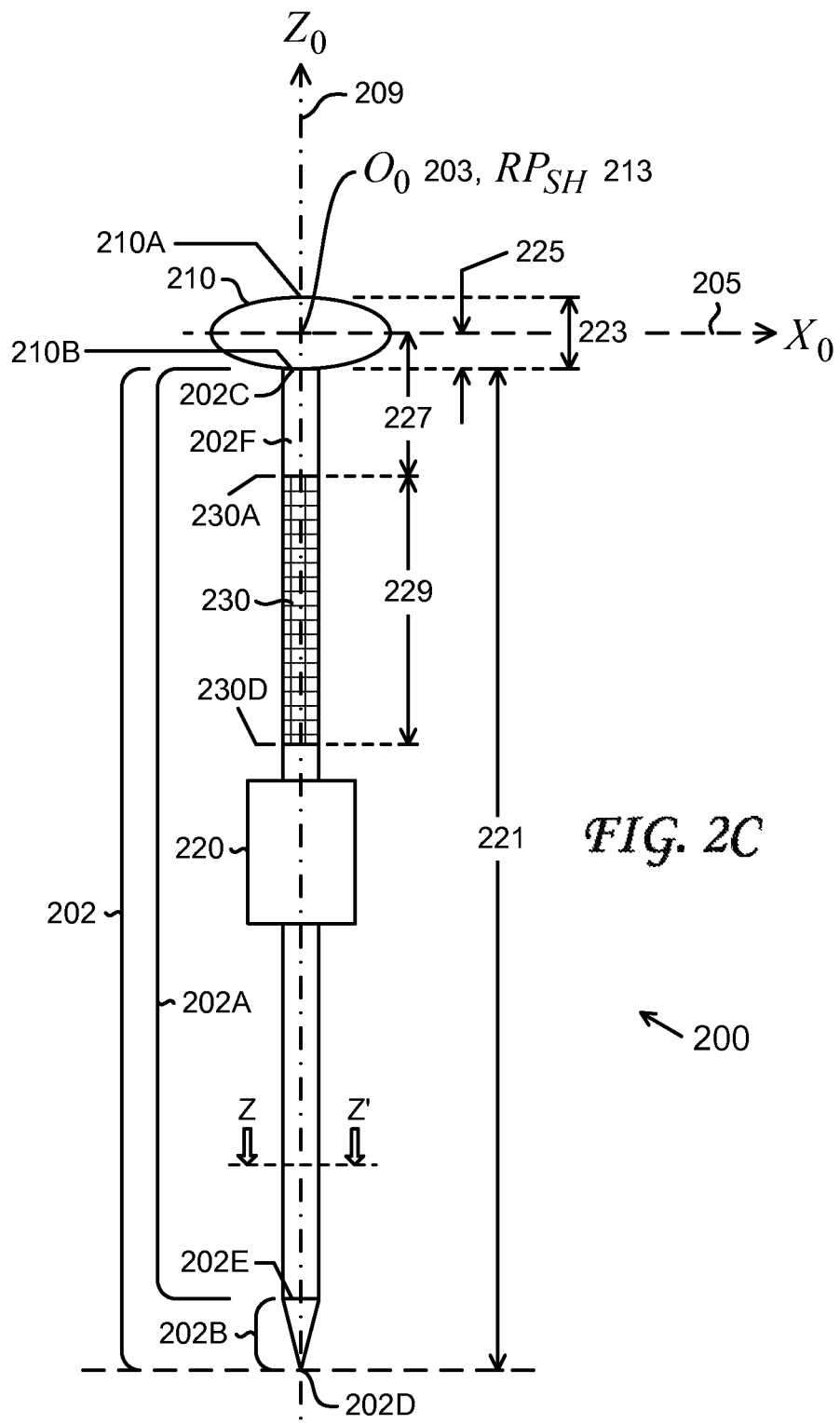
Figure 2D:
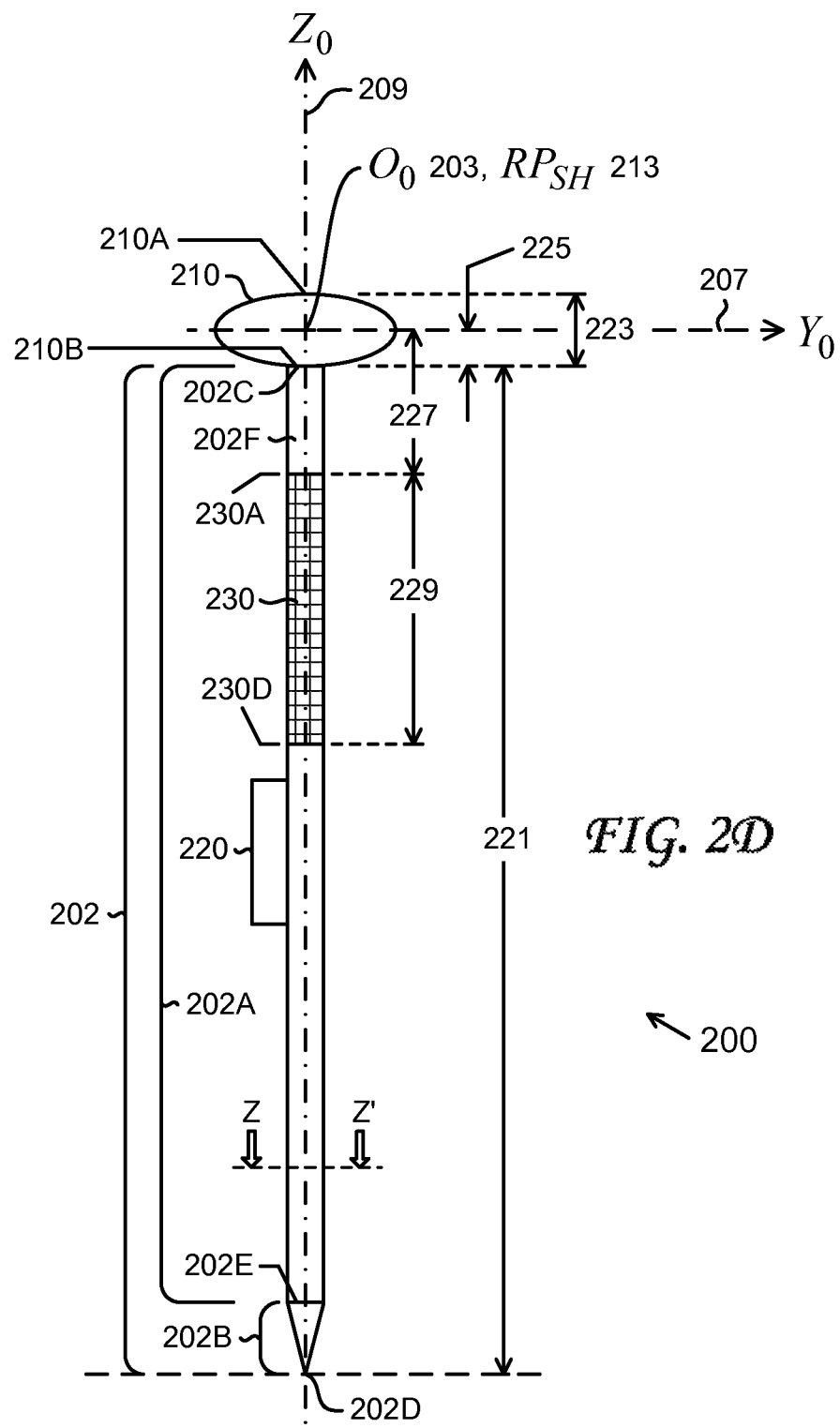

Refer to FIG. 2C (View A) and FIG. 2D (View B). The sensor pole 200 has a longitudinal axis, which is placed coincident with the $Z_0$-axis 209. The sensor pole 200 includes a shaft 202 that extends from the top end 202C to the bottom end 202D. The shaft 202 has a body portion 202A that extends from the top end 202C to the boundary 202E and a base portion 202B that extends from the boundary 202E to the bottom end 202D. The value of the length 221 of the shaft 202, measured along the $Z_0$-axis from the top end 202C to the bottom end 202D is a design choice. A typical value based on commercial survey poles is about 2 m; considerably smaller values can be used (see below).

The body portion 202A has a cylindrical geometry, and the base portion 202B has a conical geometry. The bottom end 202D corresponds to a pointed tip. FIG. 2B shows an enlarged cross-sectional view of the body portion 202A (View Z-Z'). The cross-section is orthogonal to the $Z_0$-axis; and the cross-sectional view is projected onto the $X_0$-$Y_0$ plane and sighted along the $-Z_0$-axis. The periphery is the circle 202G with a diameter 231. The value of the diameter 231 is a design choice; typical values based on commercial survey poles range from about 0.03 m to about 0.1 m.

Return to FIG. 2C and FIG. 2D. The sensor pole 200 includes a sensor head 210, mounted on the top end 202C of the shaft 202. The sensor head 210 can include one or more position or orientation sensors. The geometry of the sensor head 210 is a design choice. Examples of suitable sensors include a global navigation satellite system (GNSS) antenna, an optical prism used in conjunction with a total station, an electronic magnetic compass, an inclination sensor, and an inertial measurement unit (IMU). Different numbers of each type of sensor can be used, and different combinations of types of sensors can be used. The sensors can be mounted on or in the sensor head 210 or elsewhere on the shaft 202.

The value of the length 223 of the sensor head 210, measured along the $Z_0$-axis from the top surface 210A to the bottom surface 210B, is a design choice; typical values range from about 0.05 m to about 0.2 m. Reference point $RP_{SH}$ 213 is a reference point on or in the sensor head 210. The origin $O_0$ 203 is placed coincident with the reference point $RP_{SH}$ 213. For example, the height of the sensor head above the ground can be measured with respect to the reference point $RP_{SH}$ 213. The distance between the reference point $RP_{SH}$ 213 and the bottom surface 210B, measured along the $Z_0$-axis, is referred to as the distance 225.

In an embodiment, the sensor head 210 includes a global navigation satellite system (GNSS) antenna. Examples of GNSSs include the US Global Positioning System (GPS) and the Russian GLONASS. The GNSS antenna is operably coupled to a GNSS receiver (not shown) mounted in the sensor head 210 or elsewhere on the shaft 202. The position of the sensor head can be measured by the GNSS receiver. The position can be transmitted by the GNSS receiver to a field controller 220 (for example, via a wired or wireless interface) mounted on the shaft 202. In the embodiment shown, the field controller 220 is mounted onto the shaft 202 via a bracket or straps (not shown). Further details of the field controller 220 are described below.

If two GNSS antennas are mounted in the sensor head 210, the orientation of the sensor pole 200 can also be measured and transmitted by the GNSS receiver to the field controller 220; a single GNSS receiver with two antenna inputs can be used, or two GNSS receivers, each with a single antenna input, can be used. In some embodiments, the field controller 220 includes the computational system 136 (FIG. 1). In some embodiments, the field controller 220 includes an auxiliary computer that transmits GNSS measurements to a separate computational system 136. In some embodiments, a field controller on the sensor pole is not used, and the GNSS receiver can transmit measurements to a computational system not mounted on the sensor pole.

In an embodiment, the sensor head 210 includes an optical prism. The optical prism is used in conjunction with the total station 140 (FIG. 1) to measure the position of the sensor head. If two optical prisms are mounted in the sensor head 210, the orientation of the sensor pole 200 can also be measured. The total station 140 transmits its measurements to the field controller 220 or to another computational system, depending on the system configuration.

The sensor pole 200 further includes an optical target 230 disposed on at least a portion of the cylindrical surface 202F of the shaft 202. The optical target 230 extends from the top boundary 230A to the bottom boundary 230B. The distance between the reference point $RP_{SH}$ 213 and the top boundary 230A, measured along the $Z_0$-axis, is referred to as the distance 227. The distance between the top boundary 230A and the bottom boundary 230B, measured along the $Z_0$-axis, is referred to as the distance 229. In some embodiments, the optical target 230 is fabricated on the cylindrical surface 202F; for example, the optical target can be painted on or coated on the cylindrical surface. In some embodiments, the optical target 230 is fabricated as a label and attached to the cylindrical surface 202F; for example, the label can be attached with glue.

Refer to FIG. 2K, which shows an azimuthal projection map of an embodiment of the optical target 230. The vertical axis is the $Z_0$-axis 209, and the horizontal axis is the azimuthal angle axis $\phi_0$ 239. In this example, the optical target 230 includes two labels, label 232 and label 234. The label 232 extends along the $Z_0$-axis from the top boundary 230A ($Z_0=Z_{0T1}$ 271) to the boundary 230B ($Z_0=Z_{0T2}$ 273); and the label 234 extends along the $Z_0$-axis from the boundary 230C ($Z_0=Z_{0T3}$ 275) to the bottom boundary 230D ($Z_0=Z_{0T4}$ 277). In an embodiment, $|Z_{0T2}-Z_{0T1}|=|Z_{0T4}-Z_{0T3}|\approx5$ cm and $|Z_{0T3}-Z_{0T1}|\approx50$ cm. The optical target comprises characteristic features that are mapped to the ($Z_0,\phi_0$) coordinates. In an embodiment, the characteristic features include line segments oriented along the $Z_0$-axis and line segments oriented orthogonal to the $Z_0$-axis. The number of line segments, the orientation of a line segment, the width of a line segment, the length of a line segment, and the spacing between adjacent line segments can all be varied. In an embodiment, the characteristic features are high-contrast characteristic features; for example, black line segments against a white background. The function of the optical target is discussed below.

The sensor pole 200 is advantageous because it is based on commercial survey poles. Other embodiments of a sensor pole can be used. Refer to FIG. 2E, which shows a perspective view of the sensor pole 250. The sensor pole 250 has a longitudinal axis, which is placed coincident with the $Z_0$-axis 209. The sensor pole has the shaft 252 and the sensor head 210 (as described above) coupled to the top end of the shaft 252.

Figure 2F:
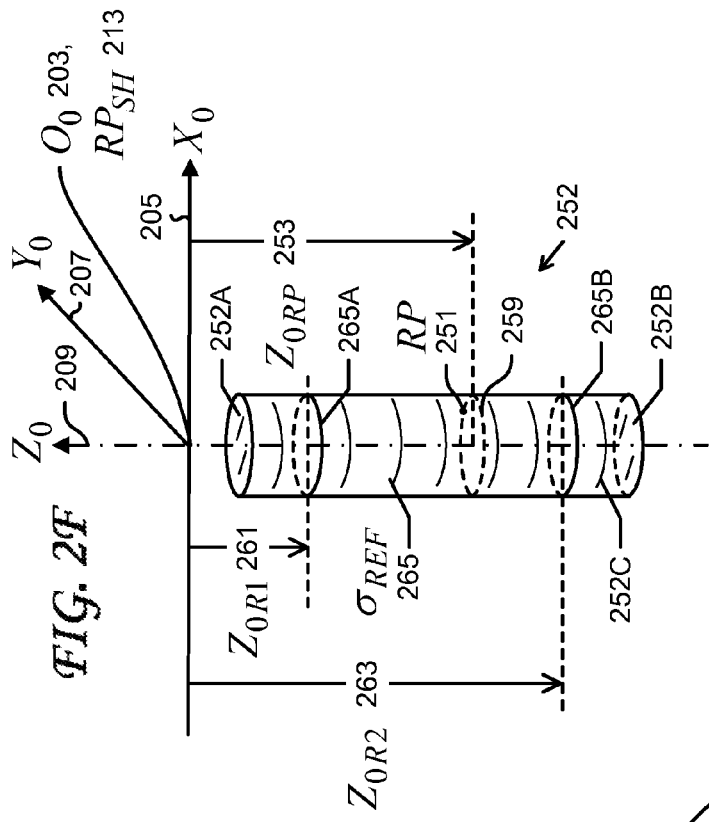
Figure 2E:
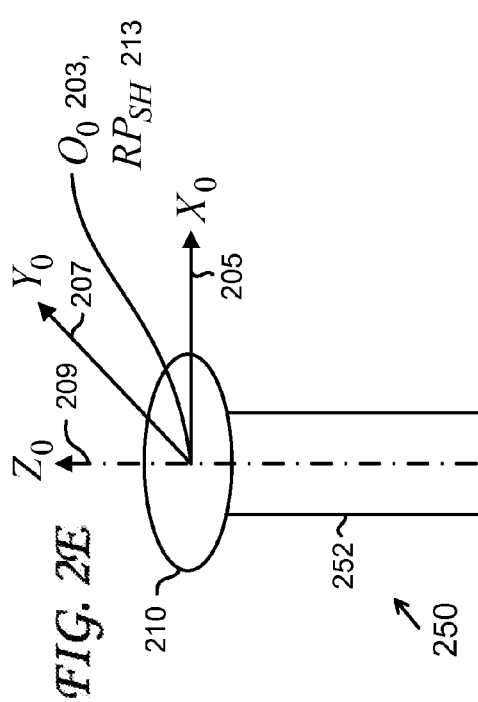

Refer to FIG. 2F, which shows a perspective view of details of the geometry of the shaft 252. The shaft 252 has a top end 252A, a bottom end 252B, and a surface 252C about the longitudinal axis. For simplicity, the shaft is shown with a solid cross-section; however, the shaft can also be a hollow tube; or some portions of the shaft can be solid, and some portions of the shaft can be hollow.

Figure 2G:
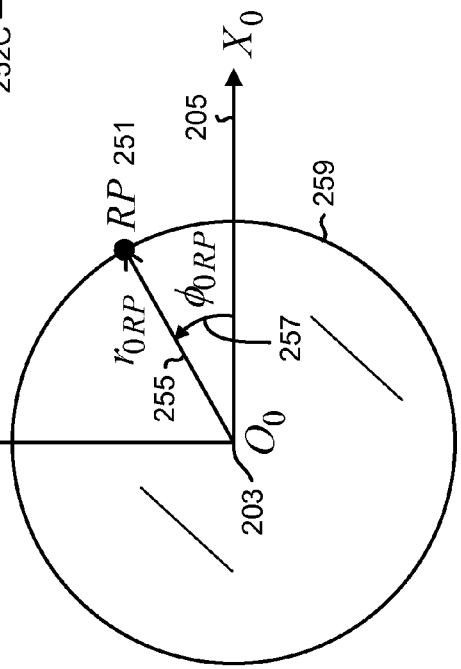

A portion of the surface 252C is referred to as the reference surface $\sigma_{REF}$ 265. In FIG. 2F and FIG. 2G, cylindrical coordinates are used. The reference surface $\sigma_{REF}$ extends from the top boundary 265A to the bottom boundary 265B. The $Z_0$-coordinate (measured along the $Z_0$-axis from the origin $O_0$) of the top boundary 265A is $Z_{0R1}$ 261; and the $Z_0$-coordinate of the bottom boundary is $Z_{0R2}$ 263. Refer to the reference point RP 251, which has the $Z_0$-coordinate $Z_{0RP}$ 253. The cross-section 259 is orthogonal to the $Z_0$-axis.

Refer to FIG. 2G, which shows an enlarged view of the cross-section 259 projected onto the $X_0$-$Y_0$ plane and sighted along the $-Z_0$-axis. The reference point RP has the radius coordinate (measured from the $Z_0$-axis) $r_0=r_{0RP}$ and the azimuthal angle coordinate (measured counter-clockwise from the $X_0$-axis) $\phi_0=\phi_{0RP}$. The reference surface $\sigma_{REF}$ is defined by the function $\sigma_{REF}(r_0,\phi_0,Z_0)$; the function is a design choice. An optical target, similar to the optical target 230 described above, can be disposed on the reference surface $\sigma_{REF}$. The optical target comprises a set of characteristic features that is mapped to the reference surface $\sigma_{REF}$; that is, the set of characteristic features are mapped to $(r_0,\phi_0,Z_0)$ coordinates. The optical target is a design choice. Note: If the optical target is a label attached to the sensor pole, then the reference surface $\sigma_{REF}$ refers to the surface of the label. In practice, the attached label can be considered as part of the sensor pole, and the reference surface $\sigma_{REF}$ can refer to a region on the surface of the sensor pole.

Figure 2J:
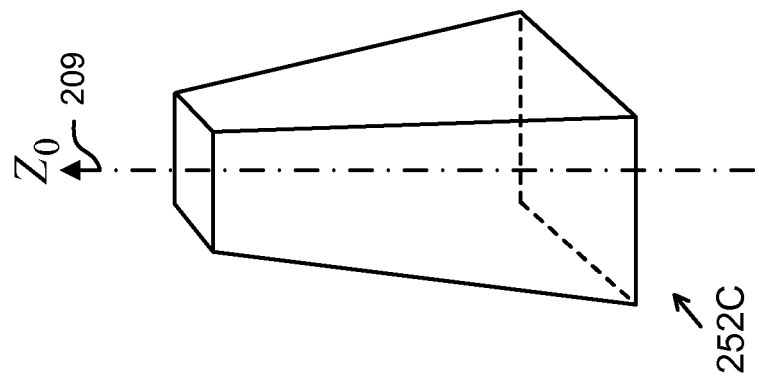
Figure 2I:
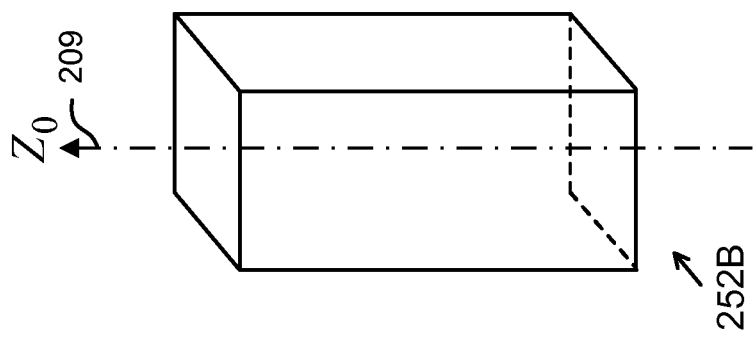
Figure 2H:
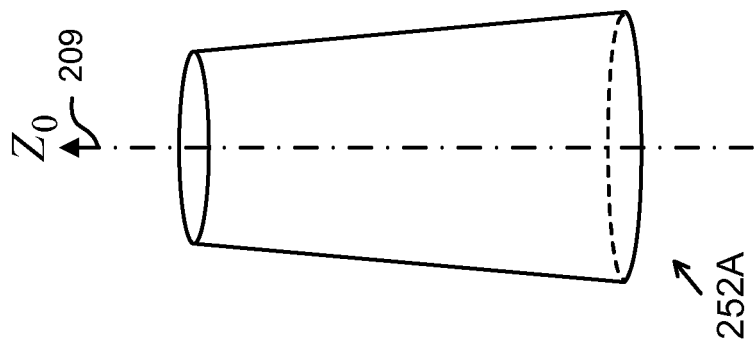

For simplicity, the shaft 252 is shown as a cylinder. In general, the geometry is a design choice. Alternative geometries are shown in the perspective views of FIG. 2H-FIG. 2J. FIG. 2H shows the shaft 252A, which has the geometry of a frustrated (truncated) cone. FIG. 2I shows the shaft 252B, which has the geometry of a polygonal prism. FIG. 2J shows the shaft 252C, which has the geometry of a frustrated pyramid. In general, the geometry does not need to be symmetric about the longitudinal axis and does not need to be constant along the longitudinal axis.

One or more sensor poles can be deployed. A sensor pole can be held by an operator or mounted onto a tripod, stand, or base positioned on the ground or off the ground; if the base portion of the shaft is appropriately configured (for example, with a sufficiently wide pedestal base), the sensor pole can be free-standing (self-supporting). Sensors and optical targets not mounted on a sensor pole can also be used. For example, sensors and optical targets can be mounted on a tree, building, fence, or tower.

Figure 3A:
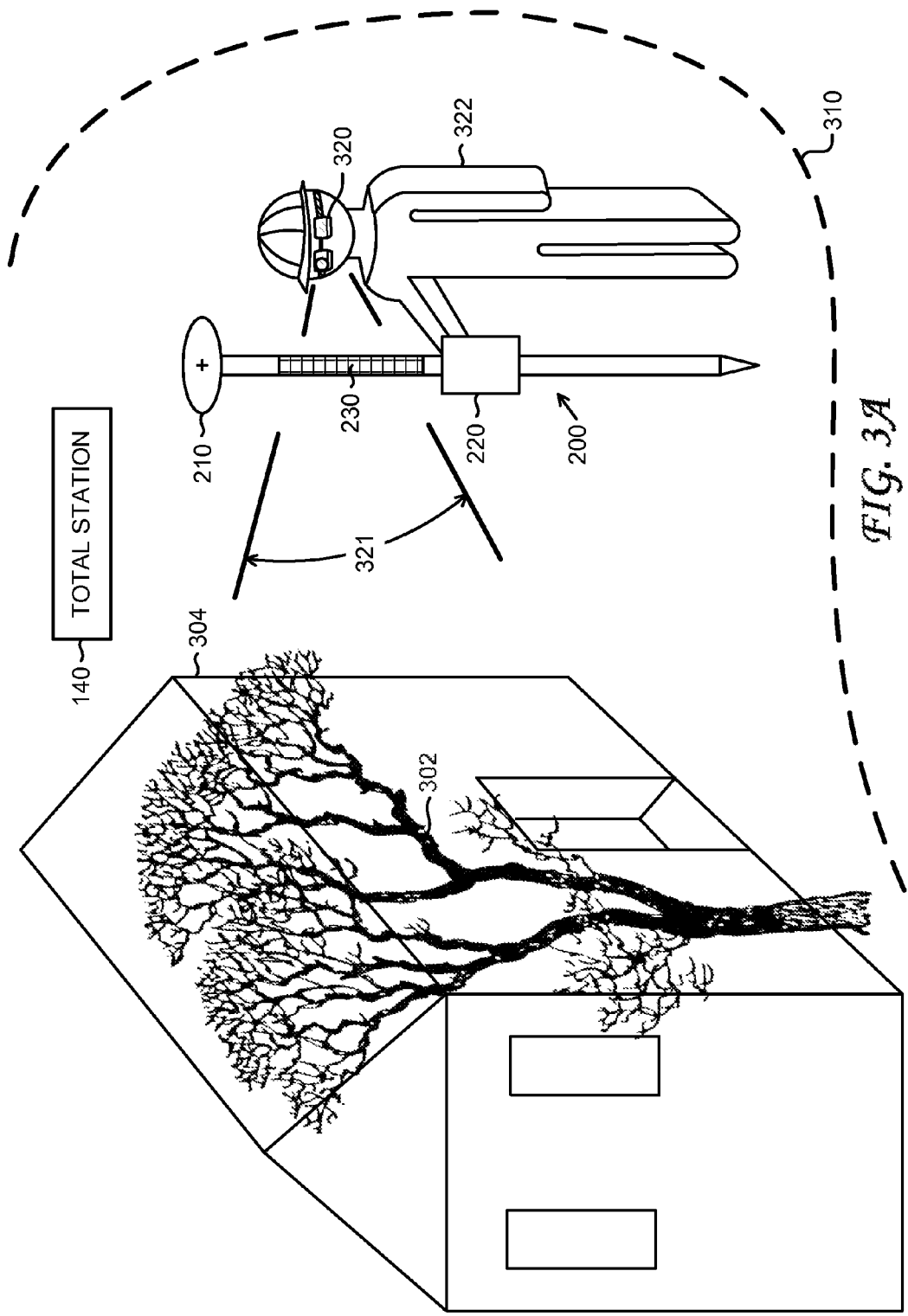
FIG. 3A and FIG. 3B show pictorial views of embodiments of systems for generating an augmented image.

In an advantageous embodiment, a single hand-held sensor pole is used. Refer to FIG. 3A. An operator 322 holds the sensor pole 200 and can walk about the site 310, which includes various landmarks, such as the landmark 302 (in this instance, a tree) and the landmark 304 (in this instance, a building). The operator 322 wears a head-mounted unit 320, which includes a camera, display, and computational system. Head-mounted units include, for example, units mounted on a helmet, units mounted on a pair of goggles, and units mounted on an eyeglass frame; units mounted on an eyeglass frame (as depicted pictorially in FIG. 3A) are advantageous. The operator 322 can readily hold the sensor pole 200 such that at least a portion of the optical target 230 is within the field-of-view 321 of the head-mounted unit 320. The head-mounted unit 320 can communicate with the field controller 220 over a wired or wireless interface; a wireless interface is advantageous.

Figure 3B:
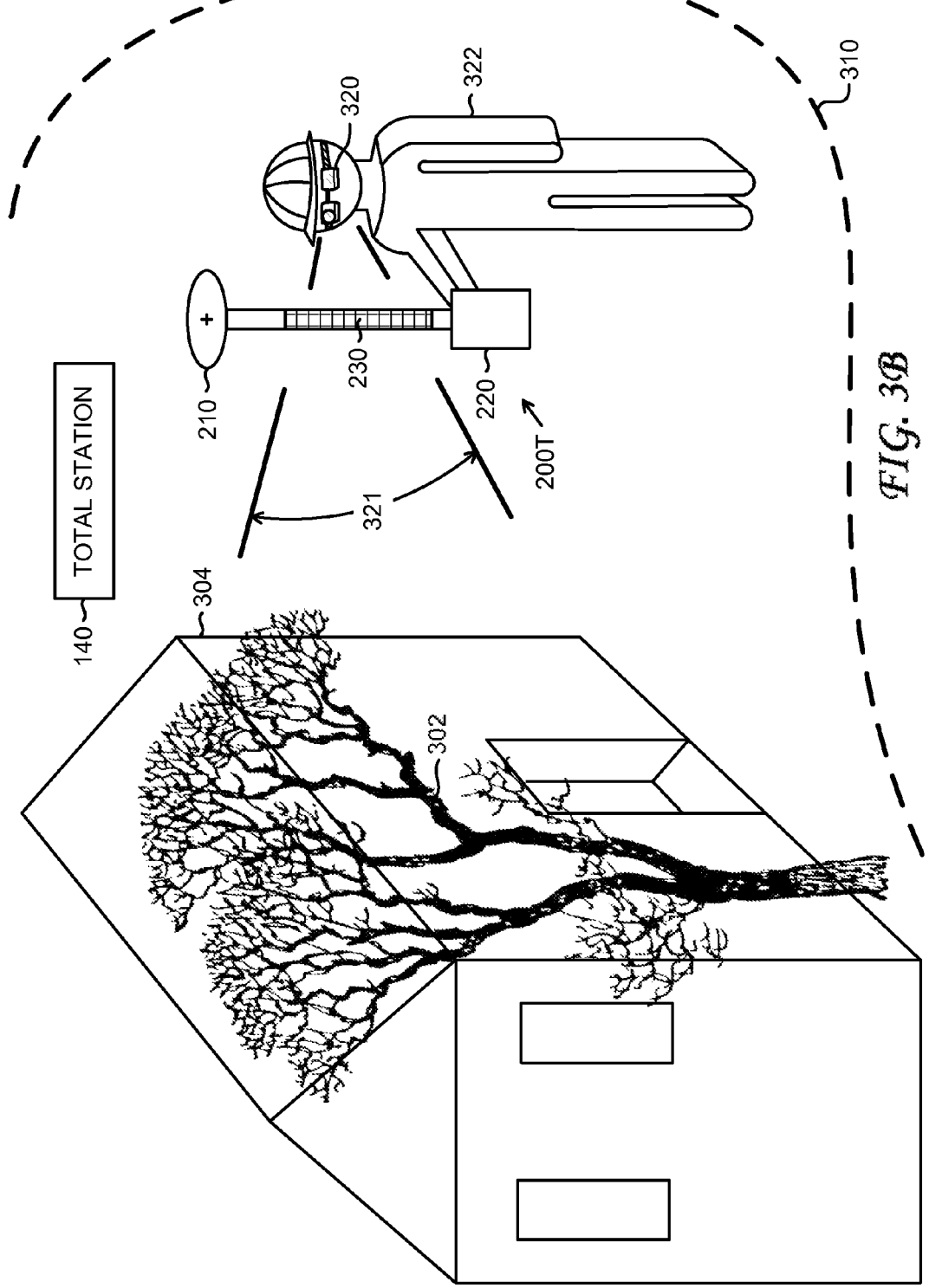

Refer to FIG. 3B. The sensor pole 200T is similar to the sensor pole 200 shown in FIG. 3A, except that the sensor pole 200T has a truncated shaft; it does not have a base portion resting on the ground.

Figure 4A:
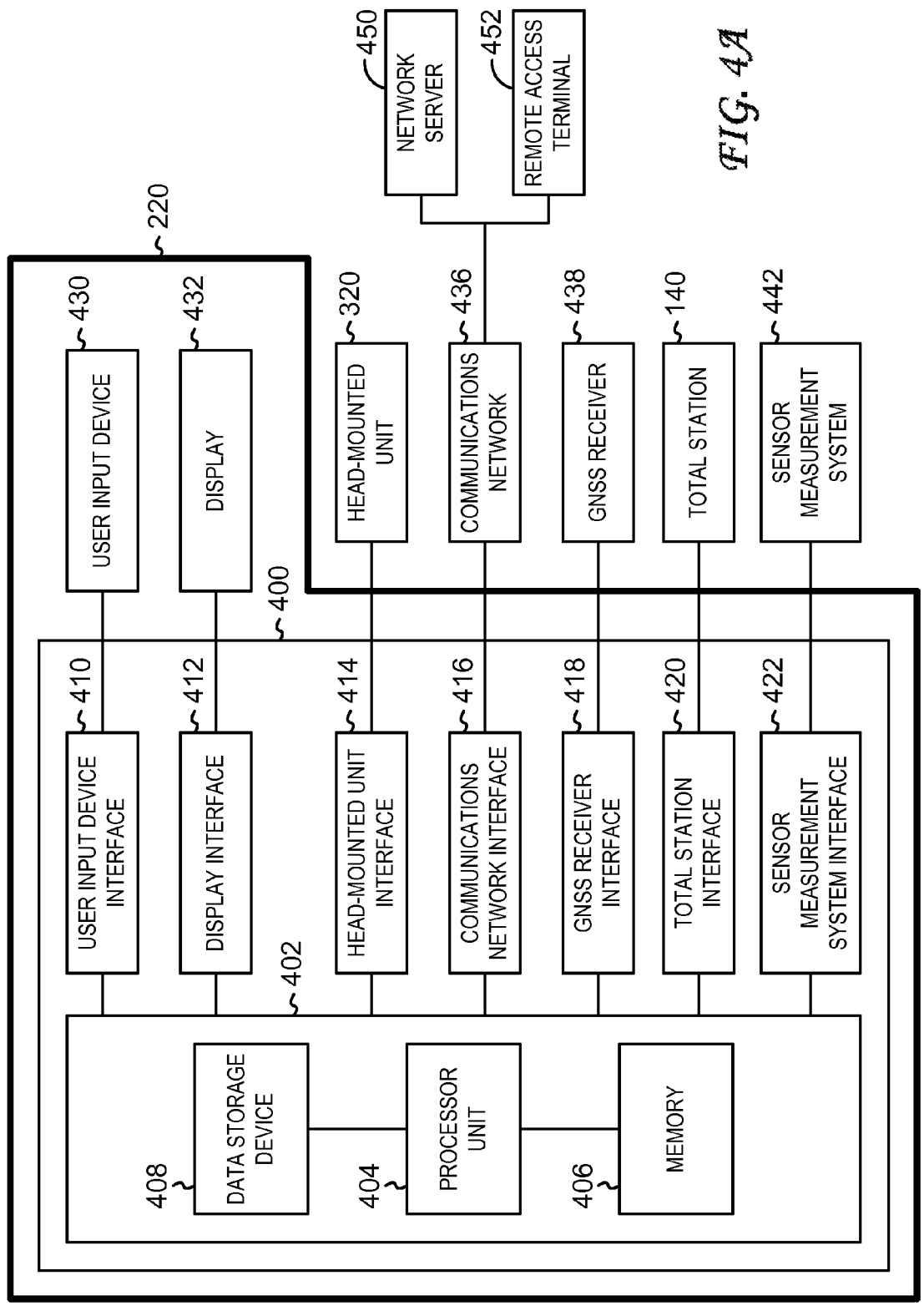
FIG. 4A shows a schematic diagram of a field controller.
Figure 4B:
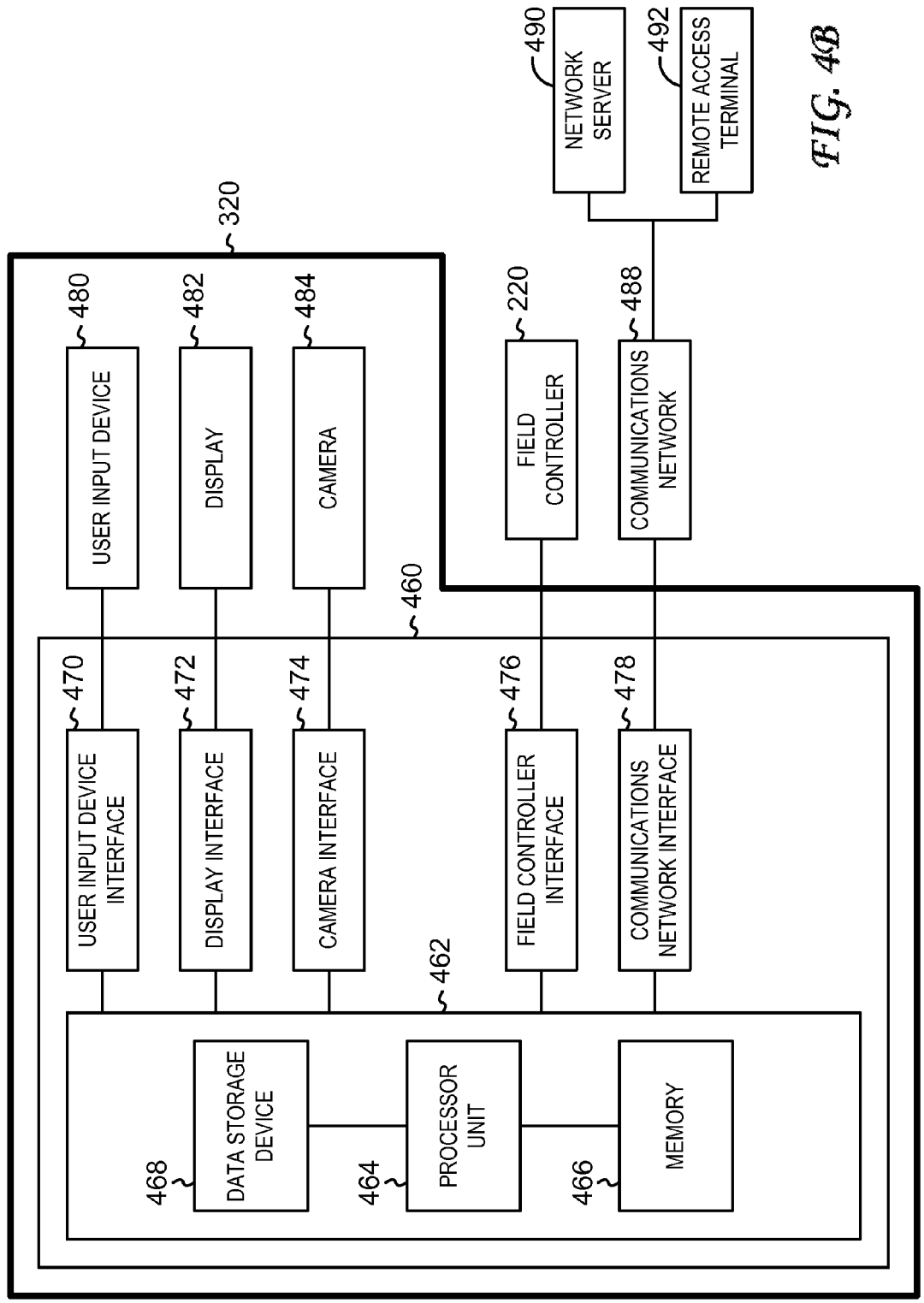
FIG. 4B shows a schematic diagram of a head-mounted unit.

One embodiment of the image and data processing system 130 (FIG. 1) includes the field controller 220 and the head-mounted unit 320. FIG. 4A and FIG. 4B show a schematic diagram of the field controller 220 and a schematic diagram of the head-mounted unit 320, respectively.

Refer to FIG. 4A. The field controller 220 includes a computational system 400, a user input device 430, and a display 432. The computational system 400 includes a computer 402, which includes a processor unit 404, memory 406, and a data storage device 408.

The computational system 400 further includes a user input device interface 410, which interfaces the computer 402 with the user input device 430. Examples of the user input device 430 include a keypad, a touchscreen, and a microphone (for voice-activated input). Data and user commands can be entered into the computer 402 via the user input device interface 410.

The computational system 400 further includes a display interface 412, which interfaces the computer 402 with the display 432. Data and images can be displayed on the display 432.

The computational system 400 further includes a head-mounted unit interface 414, which interfaces the computer 402 with the head-mounted unit 320, details of which are described below.

The computational system 400 further includes a communications network interface 416, which interfaces the computer 402 with a communications network 436. Examples of the communications network 436 include a near-field communications network, a local area network, and a wide area network. Data can be downloaded from, and uploaded to, a network server 450 via the communications network interface 416. Data can represent, for example, computer-executable code, digital models, measurements, and visual images. A user can access the computer 402 via a remote access terminal 452 communicating with the communications network 436. A user can transmit data to, and receive data from, the computer 402 via the remote access terminal 452. A user can also transmit user commands to the computer 402 via the remote access terminal 452.

The computational system 400 further includes a GNSS receiver interface 418, which interfaces the computer 402 with a GNSS receiver 438. The computer 402 can receive measurements from the GNSS receiver 438 via the GNSS receiver interface 418.

The computational system 400 further includes a total station interface 420, which interfaces the computer 402 with the total station 140. The computer 402 can receive measurements from the total station 140 via the total station interface 420. In some embodiments, the total station 140 is a robotic total station that can be controlled by the field controller 220.

The field controller 220 further includes a sensor measurement system interface 422, which interfaces the computer 402 with an additional sensor measurement system 442. Examples of the sensor measurement system 442 include inclination sensor measurement systems, electronic magnetic compass measurement systems, and inertial sensor measurement systems.

Refer to FIG. 4B. The head-mounted unit 320 includes a computational system 460, a user input device 480, a display 482, and a camera 484. In an advantageous embodiment, the head-mounted unit 320 is mounted on an eyeglass frame. The computational system 460 includes a computer 462, which includes a processor unit 464, memory 466, and a data storage device 468.

The computational system 460 further includes a user input device interface 470, which interfaces the computer 462 with the user input device 480. Examples of the user input device 480 include a touchpad, a touchstrip, a pushbutton, and a microphone (for voice-activated input). Data and user commands can be entered into the computer 462 via the user input device interface 470.

The computational system 460 further includes a display interface 472, which interfaces the computer 462 with the display 482. Data and images can be displayed on the display 482. In an embodiment, the display is a heads-up display.

The computational system 460 further includes a camera interface 474, which interfaces the computer 462 with the camera 484.

The computational system 460 further includes a field controller interface 476, which interfaces the computer 462 with the field controller 220, described above.

The computational system 460 further includes a communications network interface 478, which interfaces the computer 462 with a communications network 488. Examples of the communications network 488 include a near-field communications network, a local area network, and a wide area network. Data can be downloaded from, and uploaded to, a network server 490 communicating with the communications network 488. Data can represent, for example, computer-executable code, digital models, measurements, and visual images. A user can access the computer 462 via a remote access terminal 492 communicating with the communications network 488. A user can transmit data to, and receive data from, the computer 462 via the remote access terminal 492. A user can also transmit user commands to the computer 462 via the remote access terminal 492.

Figure 5:
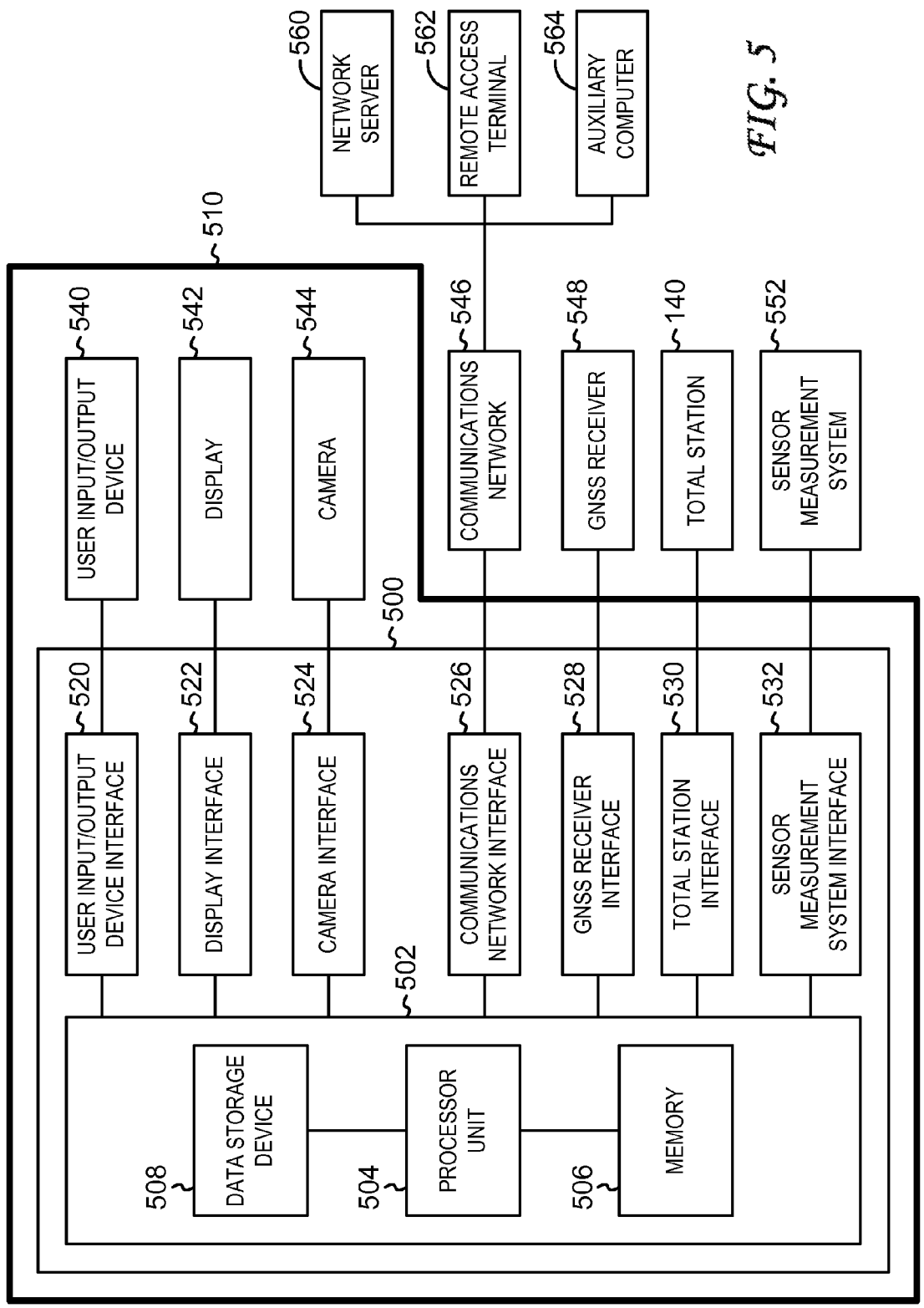
FIG. 5 shows a schematic diagram of an embodiment of an image and data processing system.

FIG. 5 shows another embodiment of the image and data processing system 130 (FIG. 1), referenced as the image and data processing system 510. The image and data processing system 510 can be implemented, for example, with a tablet computer or a laptop computer. The image and data processing system 510 includes a computational system 500, a user input/output device 540, a display 542, and a camera 544. The computational system 500 includes a computer 502, which includes a processor unit 504, memory 506, and a data storage device 508.

The computational system 500 further includes a user input/output device interface 520, which interfaces the computer 502 with the user input/output device 540. Examples of the user input/output device 540 include a keyboard, a mouse, a touchscreen, a microphone (for voice-activated input), and a local access terminal. Data and user commands can be entered into the computer 502 via the user input/output device interface 520.

The computational system 500 further includes a display interface 522, which interfaces the computer 502 with the display 542. Data and images can be displayed on the display 542.

The computational system 500 further includes a camera interface 524, which interfaces the computer 502 with the camera 544.

The computational system 500 further includes a communications network interface 526, which interfaces the computer 502 with a communications network 546. Examples of the communications network 546 include a near-field communications network, a local area network, and a wide area network. Data can be downloaded from, and uploaded to, a network server 560 communicating with the communications network 546. Data can represent, for example, computer-executable code, digital models, measurements, and visual images. A user can access the computer 502 via a remote access terminal 562 communicating with the communications network 546. A user can transmit data to, and receive data from, the computer 502 via the remote access terminal 562. A user can also transmit user commands to the computer 502 via the remote access terminal 562. An auxiliary computer 564 can communicate with the computer 502 via the communications network 546. Examples of the auxiliary computer 564 include the computers in the field controller 220 and head-mounted unit 320, described above.

The computational system 500 further includes a GNSS receiver interface 528, which interfaces the computer 502 with a GNSS receiver 548. The computer 502 can receive measurements from the GNSS receiver 548 via the GNSS receiver interface 528.

The computational system 500 further includes a total station interface 530, which interfaces the computer 502 with the total station 140. The computer 502 can receive measurements from the total station 140 via the total station interface 530. In some embodiments, the total station 140 is a robotic total station that can be controlled by the image and data processing system 510.

The computational system 500 further includes a sensor measurement system interface 532, which interfaces the computer 502 with an additional sensor measurement system 552. Examples of the sensor measurement system 552 include inclination sensor measurement systems, electronic magnetic compass measurement systems, and inertial sensor measurement systems.

In the field controller 220, the head-mounted unit 320, and the image and data processing system 510, each of the interfaces can operate over different physical media. Examples of physical media include wires, coax cables, optical fibers, free-space optics, and electromagnetic waves (typically in the radiofrequency range and commonly referred to as a wireless interface).

In the field controller 220, the head-mounted unit 320, and the image and data processing system 510, a single interface of each type was shown and described. In general, one or more of each type of interface can be implemented to interface the computer (the computer 402, the computer 462, and the computer 502, respectively) with one or more of each type of component. For example, some embodiments can have one or more display interfaces to interface the computer with one or more displays, one or more communications network interfaces to interface the computer with one or more communications networks, and one or more GNSS receiver interfaces to interface the computer with one or more GNSS receivers.

In general, not all of the types of interfaces need to be implemented. For example, some embodiments can have a GNSS receiver interface, but not a total station interface; other embodiments can have a total station interface, but not a GNSS receiver interface. Furthermore, components can communicate with the computer via one or more communications network interfaces (such as instrumentation buses, Universal Serial Bus, Ethernet, WiFi, and Bluetooth) instead of via individual dedicated interfaces.

In the field controller 220 and the image and data processing system 510, the term sensor measurement system is inclusive of a GNSS receiver and a total station. A sensor measurement system receives signals from a sensor and transmits data representing measurements by the sensor. In general, a sensor and its associated sensor measurement system are operably coupled. In some instances, a sensor and its associated sensor measurement system are integrated into a single unit. For example, an inertial measurement unit integrates inertial sensors (accelerometers, gyros, or combinations of accelerometers and gyros) with a sensor measurement system (including electronics, firmware, and software). In other instances, a sensor and its associated sensor measurement system are separate units. For example, an antenna (sensor) is operably coupled to a GNSS receiver (sensor measurement system), and an optical prism (sensor) is operably coupled to a total station (sensor measurement system).

In the head-mounted unit 320 and the image and data processing system 510, the cameras (the camera 484 and the camera 544, respectively) can be still-frame cameras or video cameras. Furthermore, the cameras can be single-view cameras or stereoscopic-view cameras. A stereoscopic-view camera can have a single camera body with two lenses, or a stereoscopic-view camera can be configured from two separate single-view cameras.

In the field controller 220, the head-mounted unit 320, and the image and data processing system 510, the computational systems (the computational system 400, the computational system 460, and the computational system 500, respectively) can be constructed by one skilled in the art from various combinations of hardware, firmware, and software. Furthermore, the computational systems can be constructed by one skilled in the art from various electronic components, including one or more general purpose microprocessors, one or more digital signal processors, one or more application-specific integrated circuits (ASICs), and one or more field-programmable gate arrays (FPGAs).

In the field controller 220, the head-mounted unit 320, and the image and data processing system 510, the processor units (the processor unit 404, the processor unit 464, and the processor unit 504, respectively) can include one or more processors. In some embodiments, the processor unit includes a single processor, a central processing unit (CPU). In other embodiments, the processor unit includes multiple processors. The multiple processors can operate in parallel, or functions can be distributed across different processors. For example, one processor can serve as a CPU, and a second processor, a graphics processing unit (GPU), can be dedicated primarily for graphics processing. Numerical computations can be performed by a CPU, a math co-processor, or a GPU. The CPU typically controls operation of the other processors.

In the field controller 220, the head-mounted unit 320, and the image and data processing system 510, the memory (the memory 406, the memory 466, and the memory 506, respectively) can be functionally and physically partitioned, for example, into system memory and video memory; video memory typically has higher speed than system memory. For example, the system memory is operably coupled to the CPU, and the video memory is operably coupled to the GPU.

In the field controller 220, the head-mounted unit 320, and the image and data processing system 510, the data storage devices (the data storage device 408, the data storage device 468, and the data storage device 508, respectively) include at least one persistent, non-transitory, tangible computer readable medium, such as non-volatile semiconductor memory or a magnetic hard drive. The data storage devices can include a removable memory card or a removable flash drive. Data stored on the data storage devices can represent, for example, computer-executable code, digital models, measurements, and visual images.

As is well known, a computer (such as the computer 402, the computer 462, and the computer 502) operates under control of computer software, which defines the overall operation of the computer and applications. The processor unit (such as the processor unit 404, the processor unit 464, and the processor unit 504) controls the overall operation of the computer and applications by executing computer program instructions that define the overall operation and applications. The computer program instructions can be stored in a data storage device (such as the data storage device 408, the data storage device 468, and the data storage device 508) and loaded into memory (such as memory 406, memory 466, and memory 506) when execution of the computer program instructions is desired.

The algorithm shown schematically in FIG. 11 (described below), for example, can be defined by computer program instructions stored in the data storage device or in memory (or in a combination of the data storage device and memory) and controlled by the processor unit executing the computer program instructions. For example, the computer program instructions can be implemented as computer-executable code programmed by one skilled in the art to perform algorithms. Accordingly, by executing the computer program instructions, the processor unit executes the algorithm shown schematically in FIG. 11.

In an embodiment, a computational system contains a two-dimensional (2D) or three-dimensional (3D) digital model of a site (or at least a portion of interest of the site). Herein, to simplify the terminology, a digital model refers to a 2D digital model or a 3D digital model. A digital model of a site, for example, can be a building information model (BIM) or a computer-aided design (CAD) model. A digital model of a site, for example, comprises points that are displayed as 2D primitive objects (for example, squares or triangles) or 3D primitive objects (for example, tetrahedrons or cubes), curves of different thicknesses, and text labels. In some embodiments, one or more digital models of sites are stored in the computational system (assuming it has sufficient data storage capacity, memory, and processor power). In the embodiment shown in FIG. 5, for example, one or more digital models of sites are stored in the computational system 500.

In the embodiment shown in FIG. 3A, FIG. 3B, FIG. 4A, and FIG. 4B, a digital model of a site is stored in the field controller 220 and portions of the digital model of the site are updated and displayed as needed on the head-mounted unit 320. The field controller 220 can also communicate with the network server 450 (FIG. 4A) to receive different digital models of sites. Note that a digital model of a site can represent the existing site or intended changes to the existing site. For example, a digital model of a site can represent buildings, fences, towers, roads, bridges, and other structures to be added to the site. A digital model of a site can also represent structures to be modified or to be removed from the site. As discussed above, a site can refer to an interior space as well as an exterior space. Therefore, a digital model of a site can also represent, for example, additions, removals, or modifications of structures, facilities, furniture, and equipment within a building.

In an embodiment, a graphical representation is generated from a digital model of a site. Herein, a graphical representation refers to a virtual image, information associated with the site, information associated with the virtual image, or any combination of a virtual image, information associated with the site, and information associated with the virtual image. Associated information refers to information associated with the site, information associated with the virtual image, or a combination of information associated with the site and information associated with the virtual image. An augmented image is generated by superimposing a graphical representation onto a visual image.

FIG. 6A-FIG. 6D and FIG. 7A-FIG. 7D show two examples of augmented images.

Figure 6A:
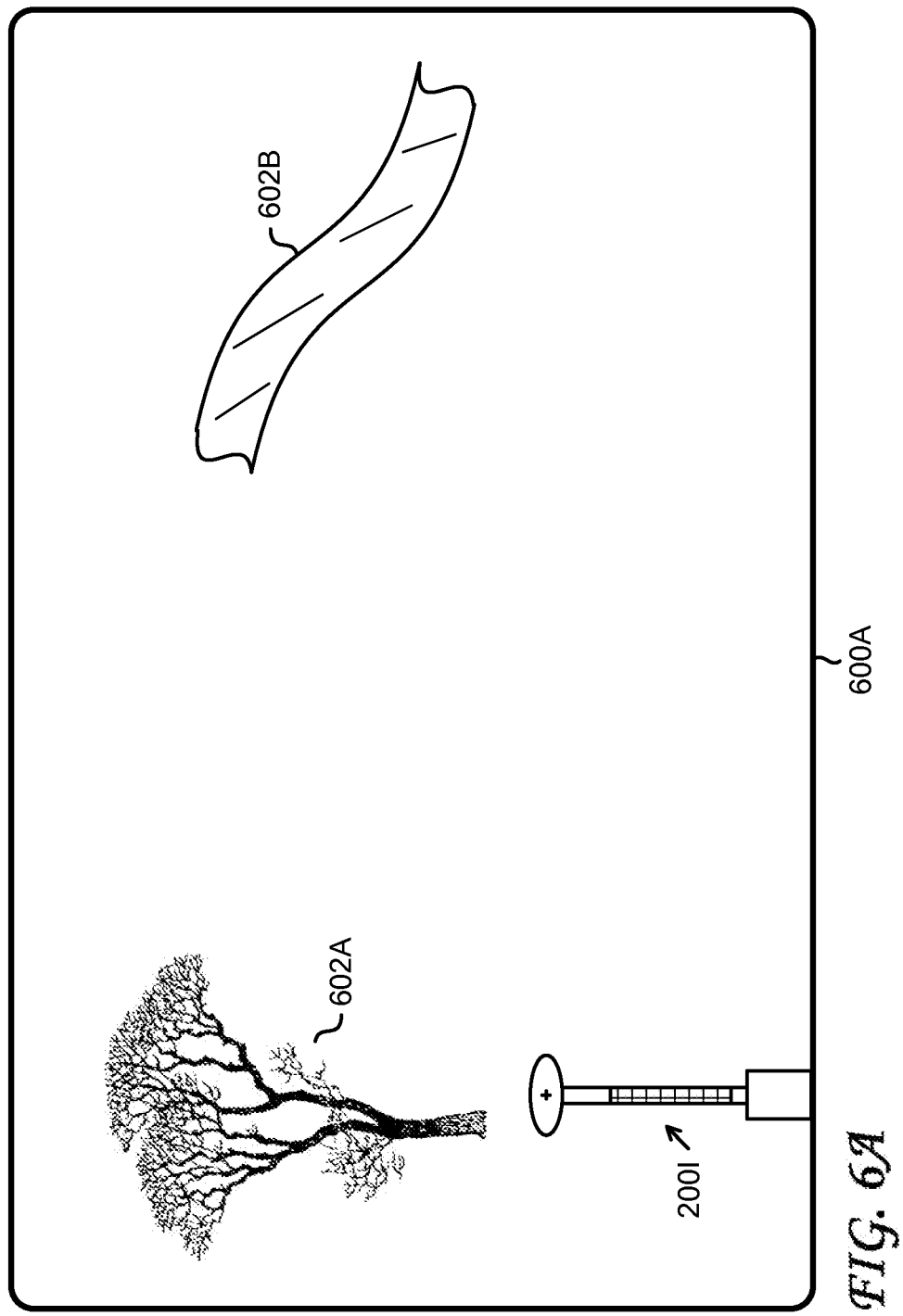
FIG. 6A-FIG. 6D show a first sequence of display images.

FIG. 6A-FIG. 6D show a first sequence of display images, displayed, for example on the display 482 (FIG. 4B) or the display 542 (FIG. 5). The heavy borders shown in the figures represent the borders of the display images. In FIG. 6A, the display image 600A displays a combined visual image, in which the combined visual image includes a visual image of a site and a visual image of at least a portion of an optical target on a sensor pole, such as the optical target 230 on the sensor pole 200 (FIG. 2C). The combined visual image is captured with a camera, such as the camera 484 (FIG. 4B) or the camera 544 FIG. 5). The function of the sensor pole is described below.

Figure 6B:
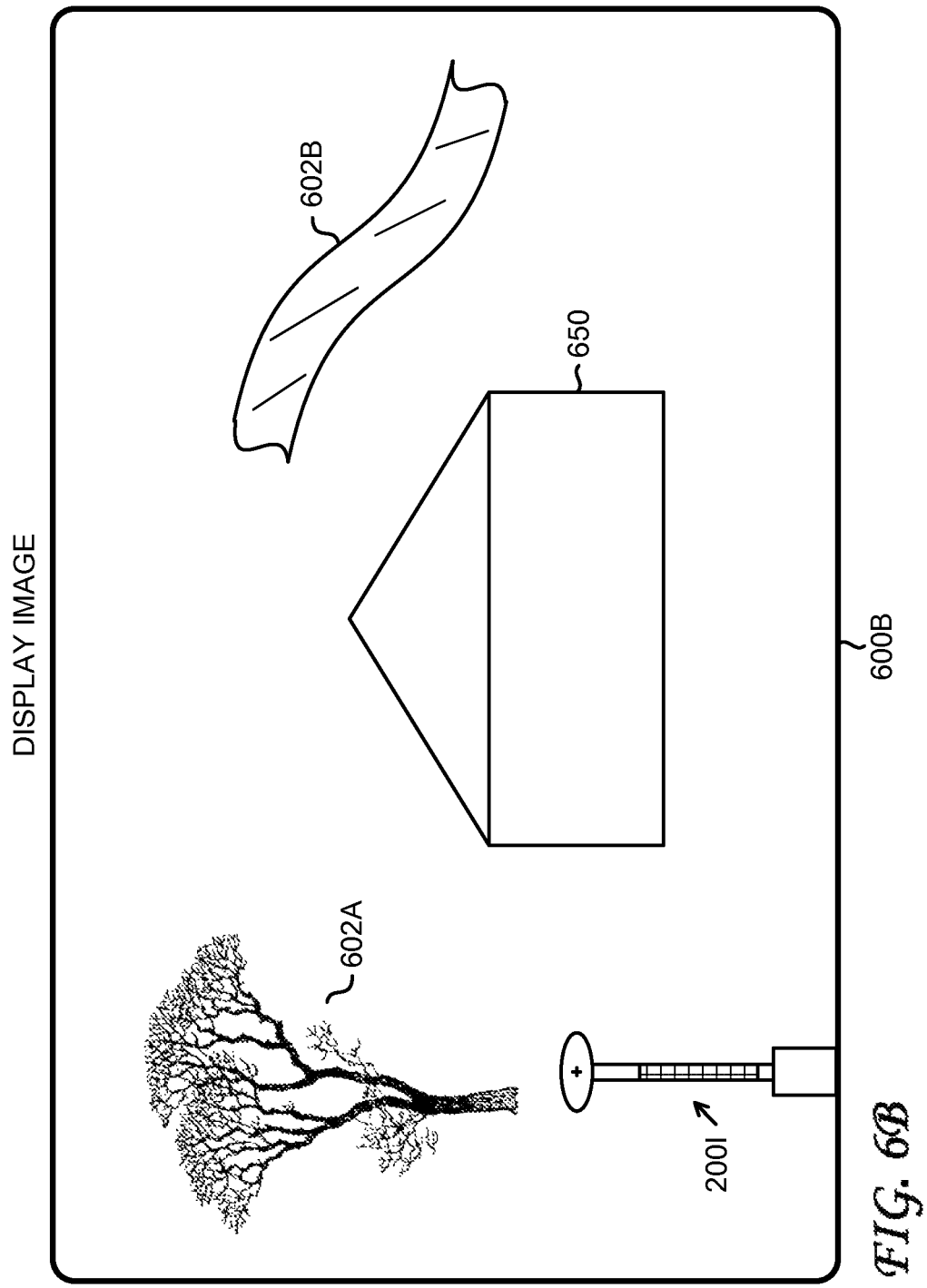
Figure 6C:
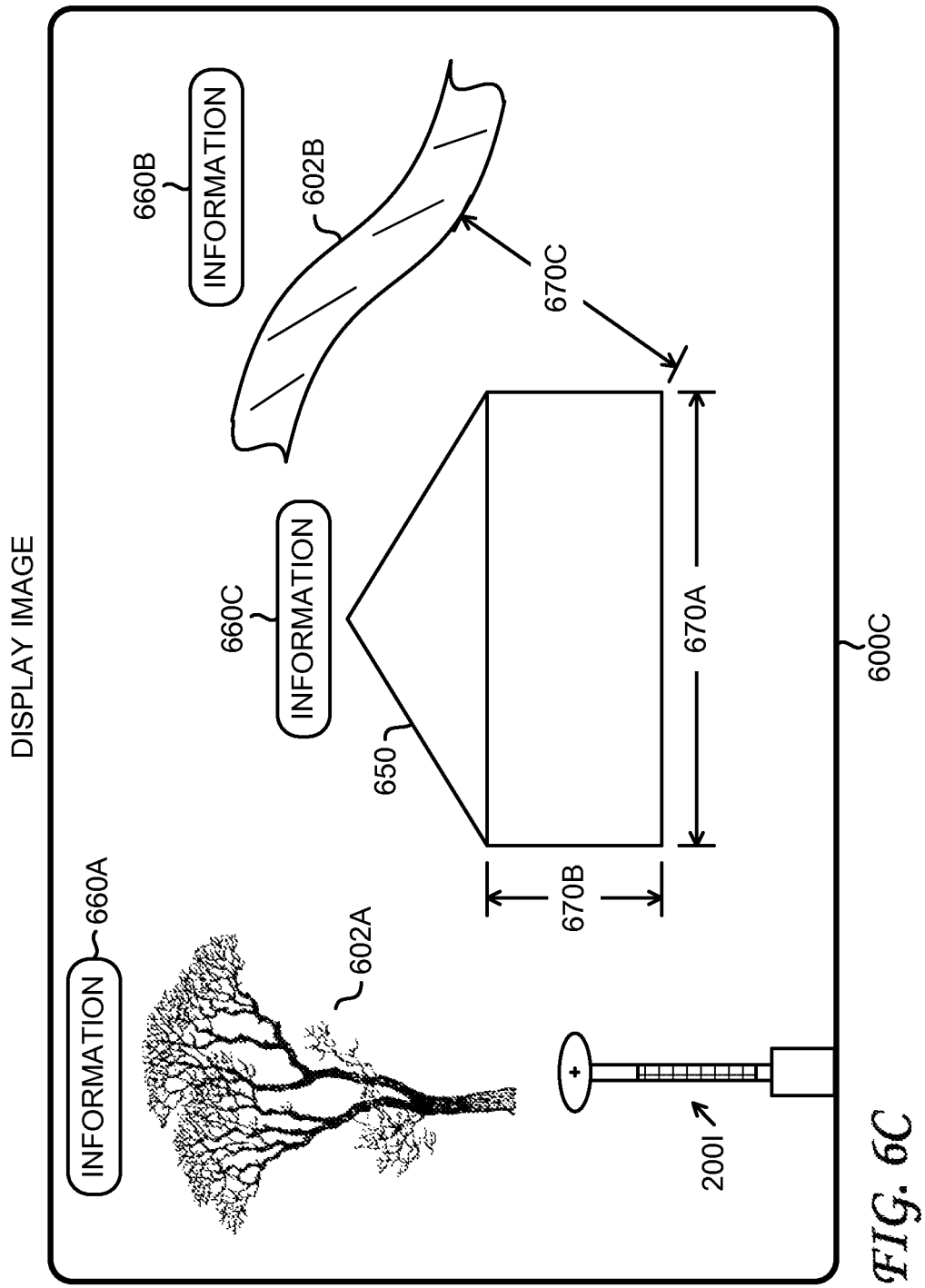

In FIG. 6A, image 602A is a visual image of a first landmark (in this instance, a tree), image 602B is a visual image of a second landmark (in this instance, a portion of a road), and image 200I is a visual image of a portion of the sensor pole 200. In FIG. 6B, the display image 600B displays an augmented image in which a virtual image 650 of a planned building is superimposed onto the display image 600A. In FIG. 6C, the display image 600C displays a further augmented image in which associated information is superimposed onto the display image 600B. For example, the dimension 670A and the dimension 670B of the planned building in the image 650 is displayed, and the distance 670C between a reference point on the planned building in the image 650 and a reference point on the landmark in the image 602B is displayed.

Arbitrary information associated with the various landmarks and planned structures can also be displayed. For example, information 660A can include the geographical coordinates, height, age, and species of the tree. Information 660B can include the geographical coordinates and designation (for example, US Highway I-78) of the road. Information 660C can include the geographical coordinates, block and lot number, and owner of the planned building.

Figure 6D:
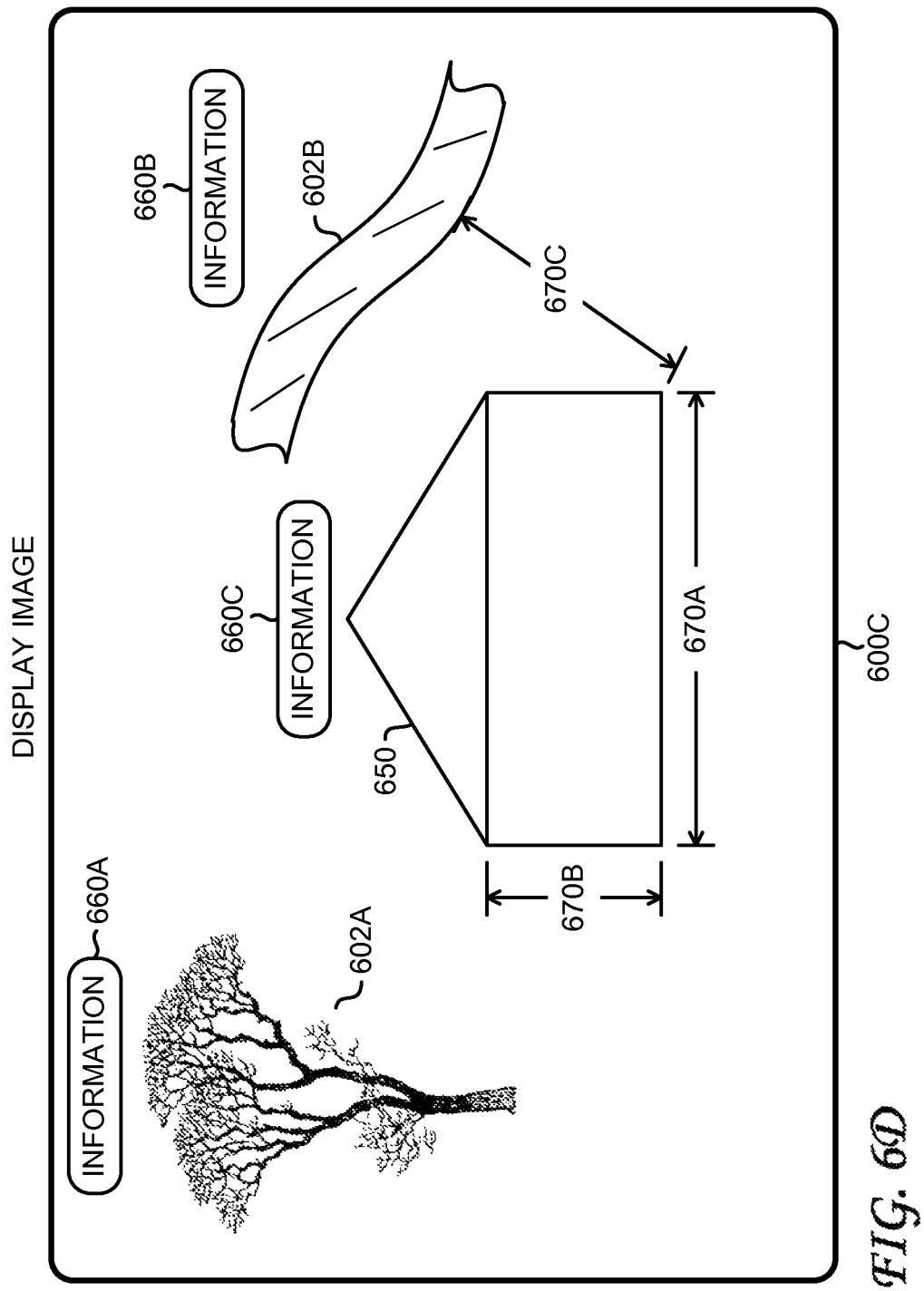

In an embodiment, as shown in FIG. 6D, the image 200I (the visual image of a portion of the sensor pole 200) is removed from the augmented image to simplify the final augmented image.

Figure 7B:
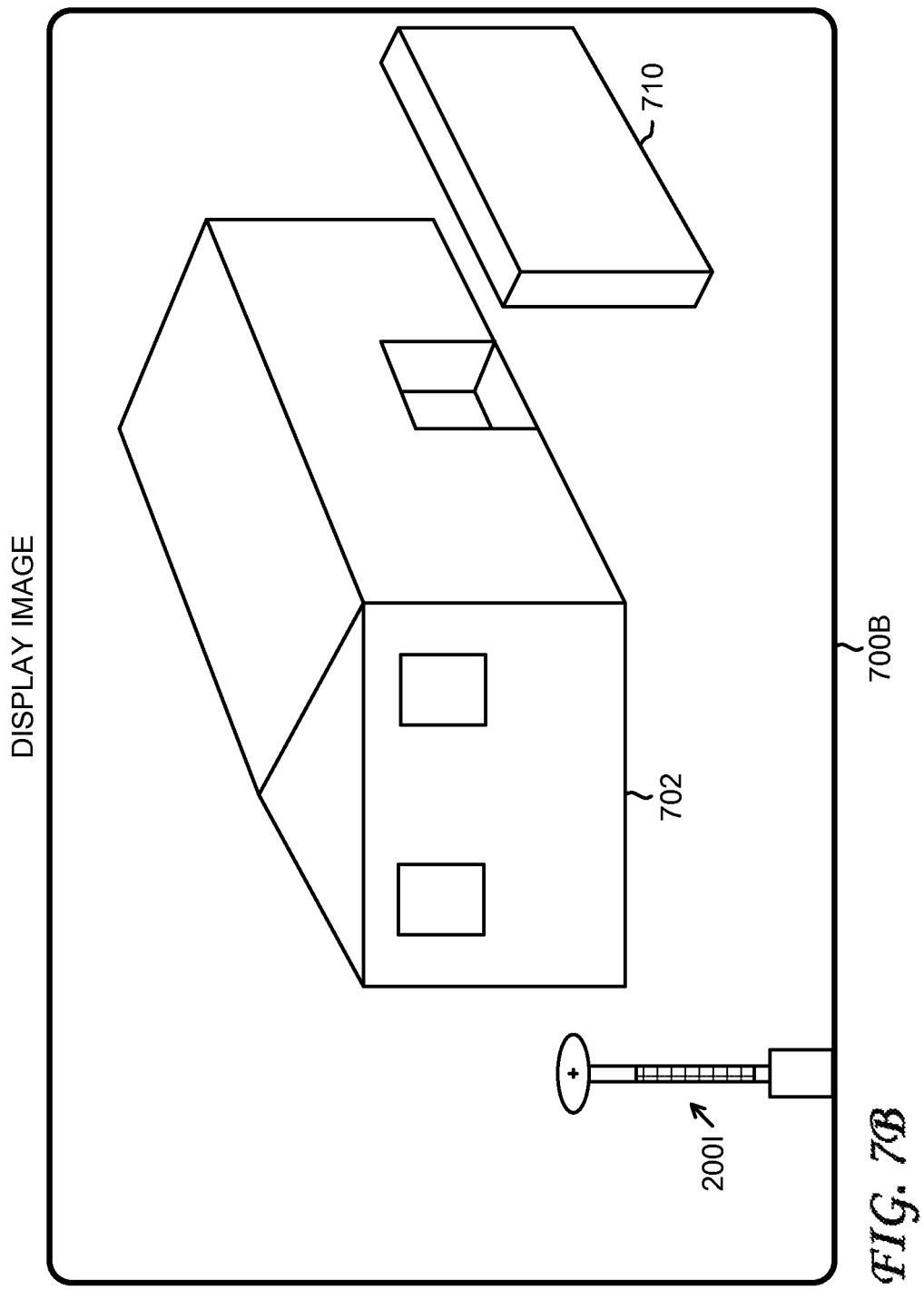

FIG. 7A-FIG. 7D show a second sequence of displays displayed, for example on the display 482 (FIG. 4B) or the display 542 (FIG. 5). The heavy borders shown in the figures represent the borders of the display images. In FIG. 7A, the display image 700A displays a combined visual image, in which the combined visual image includes a visual image of a site and a visual image of at least a portion of an optical target on a sensor pole, such as the optical target 230 on the sensor pole 200 (FIG. 2C). The combined visual image is captured with a camera, such as the camera 484 (FIG. 4B) or the camera 544 FIG. 5). The function of the sensor pole is described below.

Figure 7C:
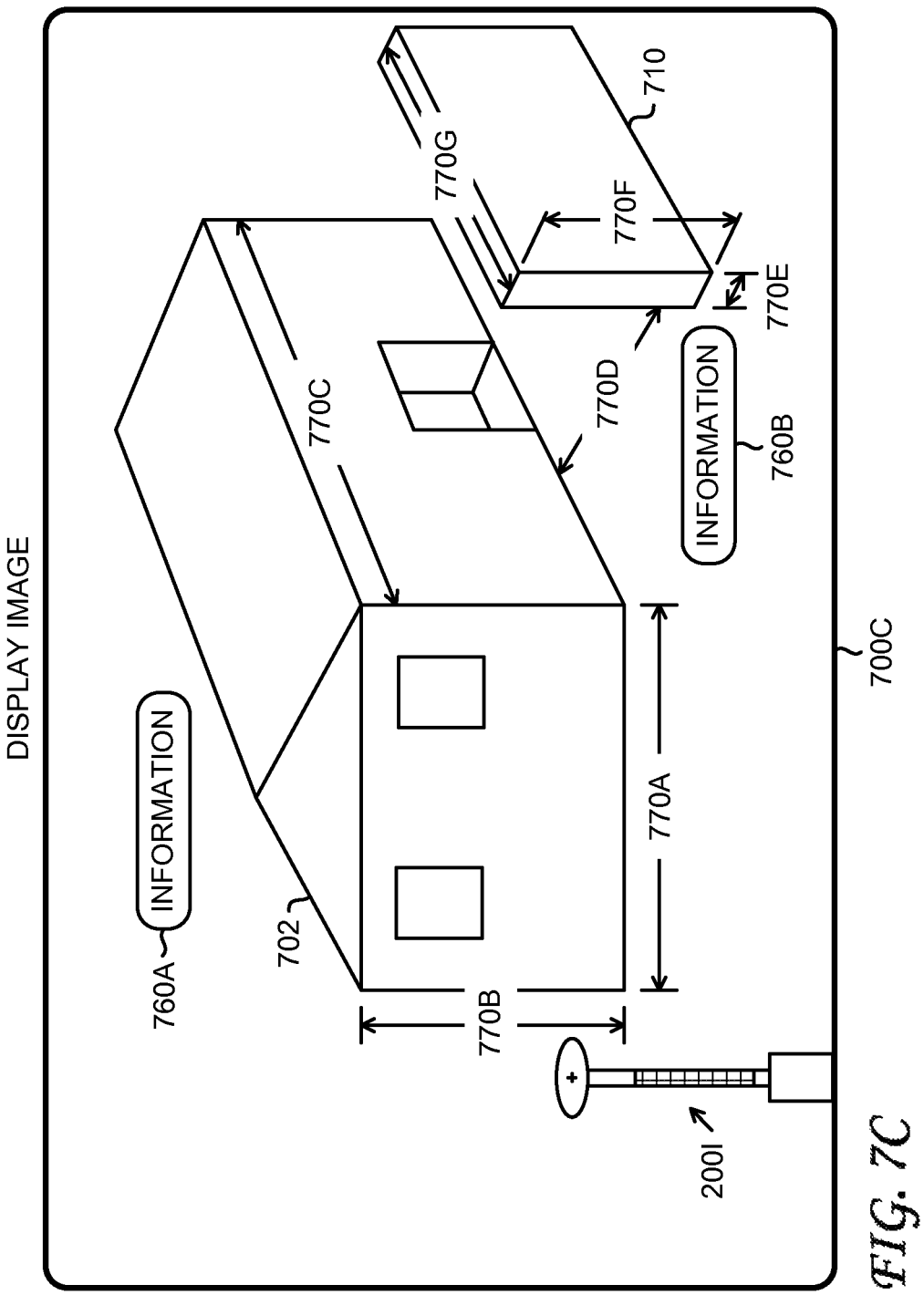

In FIG. 7A, image 702 is a visual image of a landmark (in this instance, an existing building), and image 200I is a visual image of a portion of the sensor pole 200. In FIG. 7B, the display image 700B displays an augmented image in which a virtual image 710 of a planned wall is superimposed onto the display image 700A. In FIG. 7C, the display image 700C displays a further augmented image in which associated information is superimposed onto the display image 700B. For example, the dimension 770A, the dimension 770B, and the dimension 770C of the building in the image 702 are displayed; the dimension 770E, the dimension 770F, and the dimension 770G of the planned wall in the image 710 are displayed; and the distance 770D between a reference point on the building in the image 702 and a reference point on the planned wall in the image 710 are displayed. Information 760A associated with the building and information 760B associated with the planned wall are also displayed. The information 760B, for example, can include the geographical coordinates of the planned wall and the construction material of the planned wall.

Figure 7D:
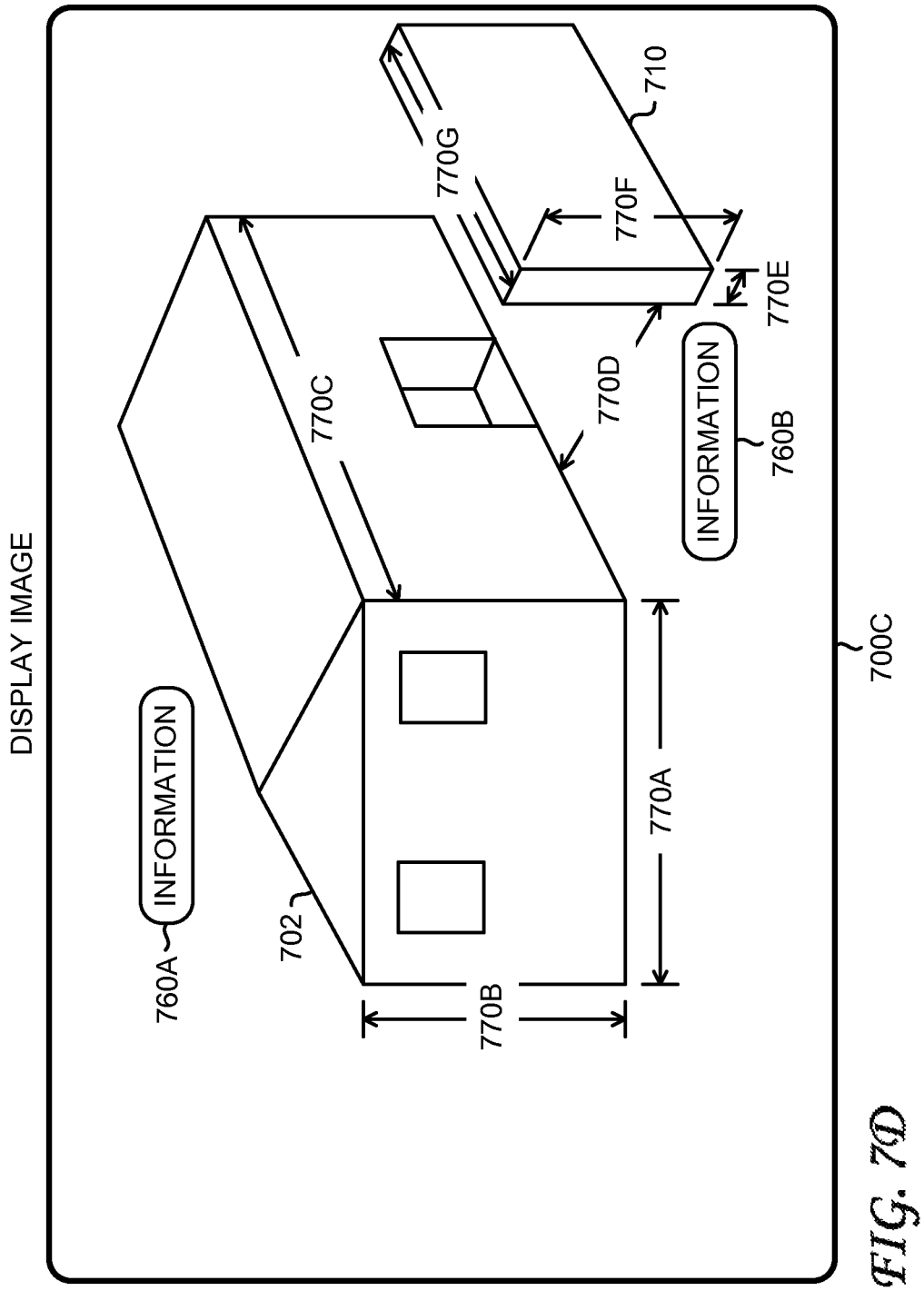

In an embodiment, as shown in FIG. 7D, the image 200I (the visual image of a portion of the sensor pole 200) is removed from the augmented image to simplify the final augmented image.

In summary, in some applications, a model of future construction is superimposed (for example, as wireframes) onto a visual image of the existing site (a visual image of an existing site is also referred to as a real-world image of the existing site). The model, for example, can include boundaries of buildings, roads with pavements, and bridges. There are two major modes of survey work that can benefit from an augmented display. In the first (stakeout) mode, modelled data is staked out on the actual ground (site). With an augmented display, the operator can readily navigate to the points that need to be staked out. In the second (survey) mode, the operator adds data to the existing digital model of the site by measuring objects on the ground (such as existing fire hydrants, posts, roads, and buildings). It is advantageous to view a virtual image of the existing digital model of the site superimposed onto the real-world image of the site to quickly find out where the existing digital model of the site should be extended (or where more details or information should be included). It is also advantageous to see in real time (or near real time) how newly measured data appears on the superimposed image.

Besides the digital model of the site itself, extra positioning information can be superimposed onto the visual image [for example, speed and direction of movement of the operator, and accuracy of positioning (such as horizontal and vertical root-mean-square values, standard deviations, and error estimates)]. In the stakeout mode, for example, basic navigation cues can be displayed as well (for example, an arrow to display suggested direction of movement to reach a specific target).

An embodiment of a process for generating an augmented image is shown schematically in FIG. 8A-FIG. 8C and FIG. 9A-FIG. 9E.

Figure 8A:
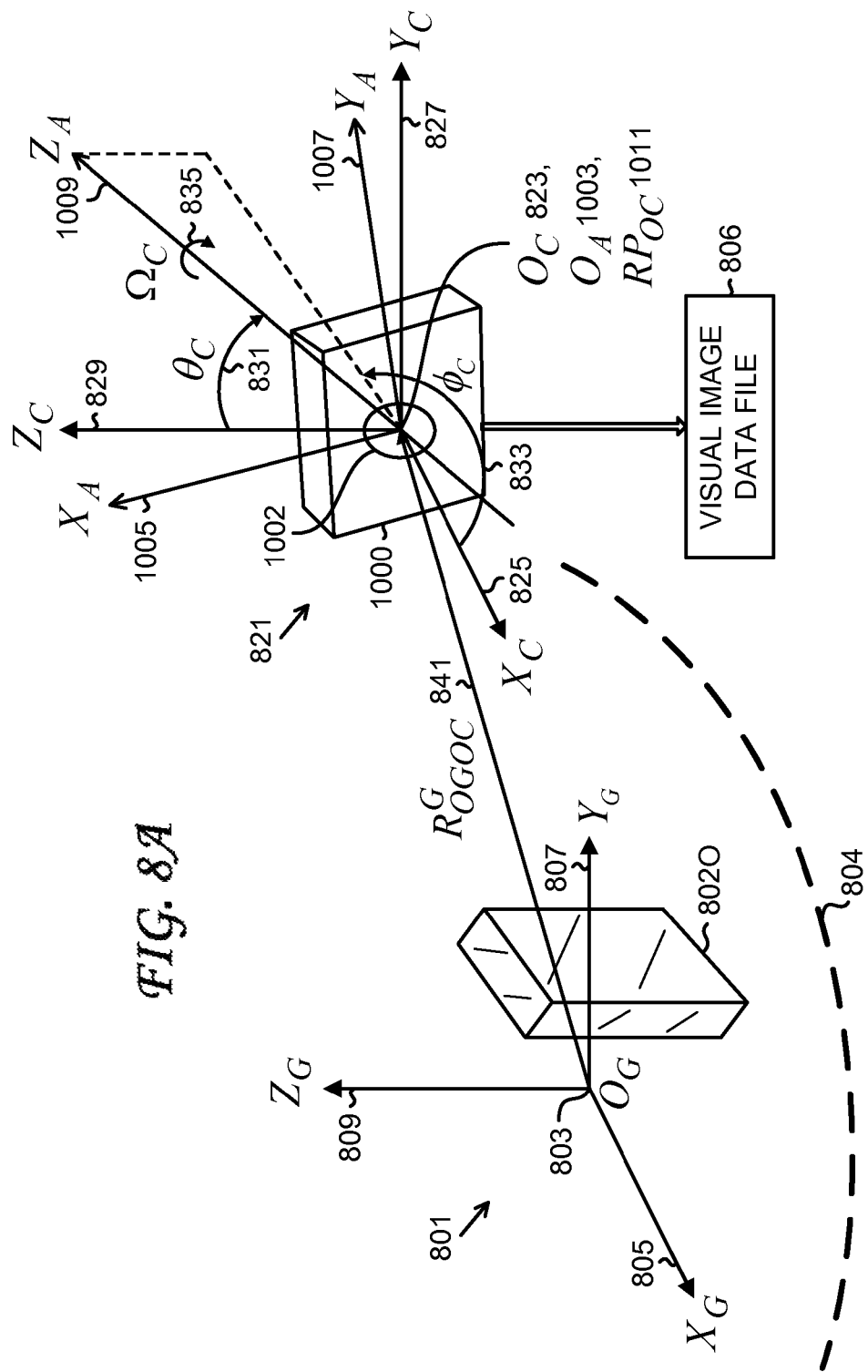
FIG. 8A-FIG. 8D show Cartesian reference frames.

Refer to FIG. 8A. FIG. 8A shows a perspective view of the Cartesian reference frame 801, fixed to the ground (site). The Cartesian reference frame 801 is defined by the origin $O_G$ 803, $X_G$-axis 805, $Y_G$-axis 807, and $Z_G$-axis 809. The Cartesian reference frame 801, for example, can be a local ENU navigation reference frame, in which the $X_G$-axis points East (E), the $Y_G$-axis points North (N), and the $Z_G$-axis points Up (U). In common practice, the $X_G$-$Y_G$ plane is tangent to the World Geodetic System 1984 (WGS-84) Earth ellipsoid; however, various other orientations can be used. The Cartesian reference frame 801 is also referred to as the site reference frame, the real-world reference frame, and the object reference frame.

Shown is a representative object 802O (which can, for example, correspond to any one of the landmarks, landmark 102A-landmark 102E, described above with reference to FIG. 1) in the site 804. The camera 1000 captures a visual image of the site 804 with the object 802O. The visual image is represented by data stored in the visual image data file 806.

Figure 9A:
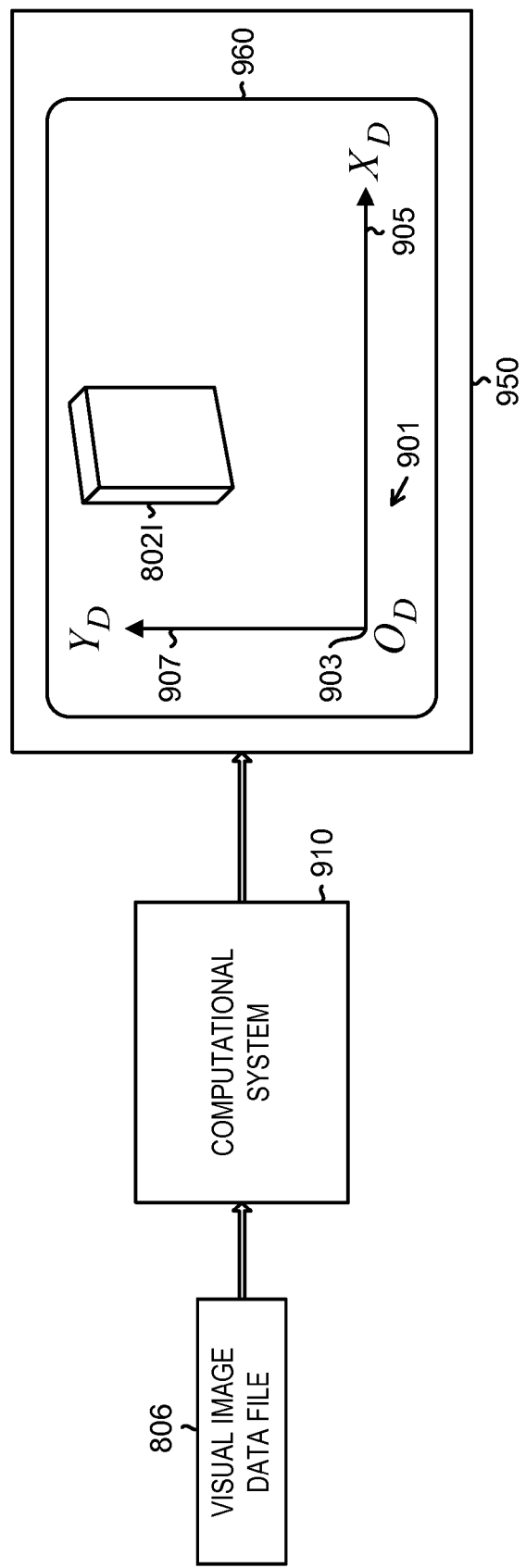
FIG. 9A-FIG. 9E show schematic diagrams of an embodiment of a method for generating an augmented image.

Refer to FIG. 9A. The visual image data file 806 is inputted into the computational system 910. The computational system 910 processes the visual image data file 806 and generates the display image 960 on the display 950. The visual image 802I is a visual image of the object 802O (FIG. 8A).

Shown in FIG. 9A is the Cartesian reference frame 901, fixed to the display 950. The Cartesian reference frame 901 is defined by the origin $O_D$ 903, $X_D$-axis 905, and $Y_D$-axis 907. The Cartesian reference frame 901 is referred to as the display reference frame and the screen reference frame. The display coordinates can be represented in length units (such as mm) or in pixel units.

The camera 1000, the computational system 910, and the display 950 map the object 802O in the object reference frame to the visual image 802I in the display reference frame. The mapping occurs in two stages: In the first stage, the camera 1000 maps the object 802O to the visual image data file 806. In the second stage, the computational system 910 and the display 950 map the visual image data file 806 to the visual image 802I.

Figure 9B:
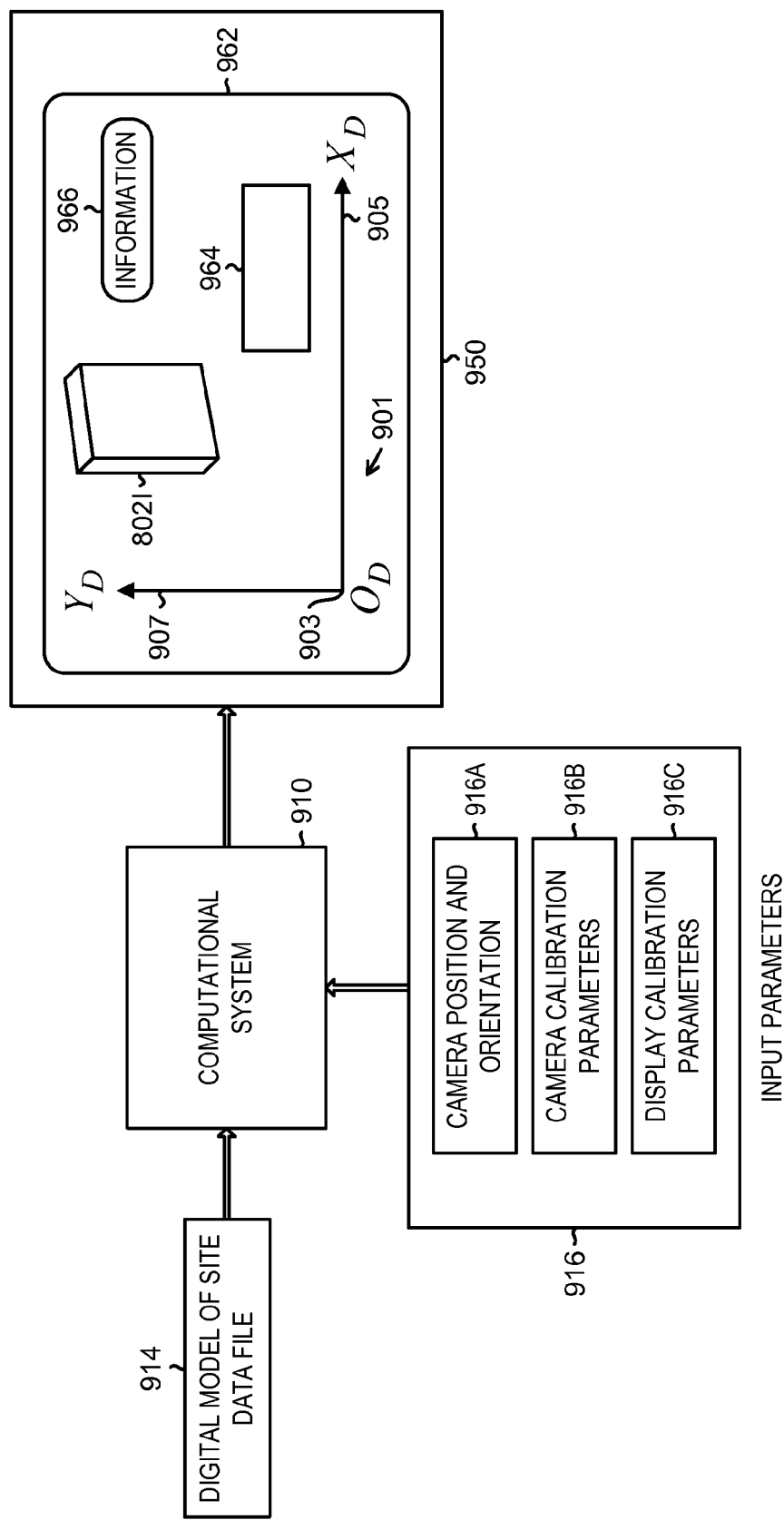

Refer to FIG. 9B. The computational system 910 receives the data file 914, which includes a digital model of the site, and the input parameters 916. The computational system 910 generates a virtual image 964 and associated information 966, which are superimposed on the display image 960 (FIG. 9A) to generate the display image 962. The display image 962 is an augmented image.

A digital model of a site is represented by a two-dimensional (2D) or three-dimensional (3D) data set. A rendering process generates a 2D virtual image from the data set; the virtual image is then displayed on a 2D display. The rendering process generates a data set that is used as input to a video processor that generates the virtual image on the display. Since the virtual image is to be superimposed onto a visual image captured by a camera and displayed on the display, the virtual image is rendered such that it is corresponds to an image captured with the camera. Associated information can also be extracted from the digital model of the site and displayed on the display.

The data set for the digital model of the site is referenced to the site or object reference frame (Cartesian reference frame 801 in FIG. 8A), and the data set for the virtual image is referenced to the display reference frame (Cartesian reference frame 901 in FIG. 9B). The computational system 910 generates the data set for the virtual image such that the virtual image is equivalent to a visual image captured by the camera 1000 (FIG. 8A). The input parameters 916 are input parameters to image processing algorithms executed in software by digital libraries to generate the data set for the virtual image. For example, DirectX or OpenGL 3D Application Programming Interface (API) software libraries can be used.

The input parameters 916 include three subsets of parameters: the camera position and orientation 916A, the camera calibration parameters 916B, and the display calibration parameters 916C. Details of each subset are discussed below.

Figure 10A:
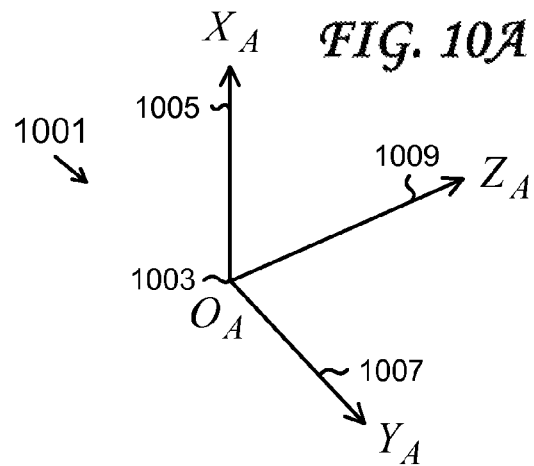
FIG. 10A-FIG. 10C show schematic diagrams of a camera.
Figure 10B:
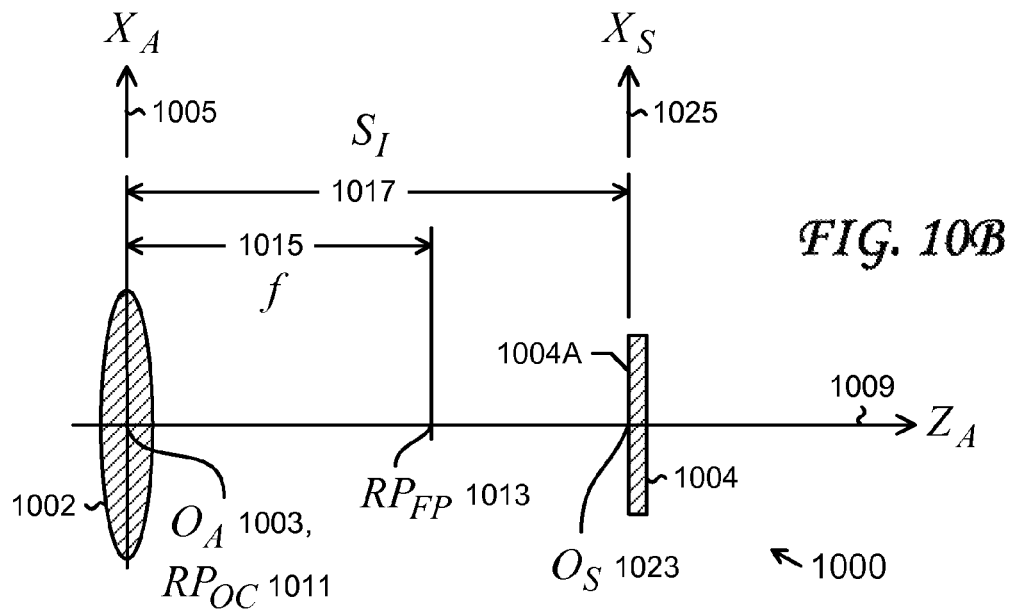
Figure 10C:
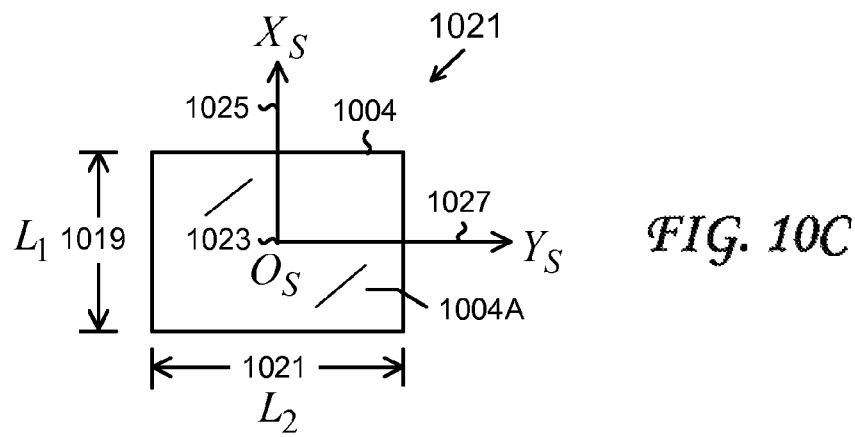

First consider the camera calibration parameters. Refer to FIG. 10A-FIG. 10C. The geometry of the camera is described with respect to a Cartesian reference frame fixed to the camera. FIG. 10A shows a perspective view of the Cartesian reference frame 1001, defined by the origin $O_A$ 1003, $X_A$-axis 1005, $Y_A$-axis 1007, and $Z_A$-axis 1009.

Refer to FIG. 10B, which shows a cross-sectional view of the camera; the cross-section is taken through the $X_A$-$Z_A$ plane. The camera 1000 includes the lens 1002 and the image sensor 1004. The lens 1002 has an optical axis (placed coincident with the $Z_A$-axis), an optical center $RP_{OC}$ 1011 (placed coincident with the origin $O_A$), and a focal point referenced as $RP_{FP}$ 1013. The image sensor 1004 has a front surface 1004A, which is the image plane.

Refer to FIG. 10C, which shows a front view (sighted along the $+Z_A$-axis), of the front surface 1004A. The geometry is referenced with respect to the 2D Cartesian coordinate system 1021, defined by the origin $O_S$ 1023, $X_S$-axis 1025, and $Y_S$-axis 1007. The Cartesian axes ($X_S$, $Y_S$) are parallel to the Cartesian axes ($X_A$, $Y_A$), respectively. The image sensor 1004 is represented by a rectangle with a length $L_1$ 1019 measured along the $X_S$-axis and a length $L_2$ 1021 measured along the $Y_S$-axis.

Refer back to FIG. 10B. The focal length of the lens 1002 is the distance f 1015, measured along the optical axis, between the optical center and the focal point. The image distance $S_I$ 1017, measured along the optical axis, is the distance between the optical center and the image plane. The focal length is a key camera calibration parameter. Other camera calibration parameters can characterize lens defects, such as distortion across the image plane. The camera calibration parameters for a specific model of camera can be determined by measuring the camera calibration parameters for multiple samples of the specific model of camera; the measurements can be averaged and stored (weighted averages can be used).

Next consider the camera position and orientation. Refer back to FIG. 8A. FIG. 8A shows a perspective view of the Cartesian reference frame 821. The Cartesian reference frame 821 is defined by the origin $O_C$ 823, $X_C$-axis 825, $Y_C$-axis 827, and $Z_C$-axis 829. As discussed above, the camera 1000 has a lens 1002 with an optical axis referenced as the $Z_A$-axis 1009. The origin $O_C$ is fixed to a reference point in the camera 1000; in this example, the reference point is coincident with the optical center $RP_{OC}$ 1011 of the lens 1002, which, as discussed above, is also coincident with the origin $O_A$ 1003. The Cartesian axes ($X_C$, $Y_C$, $Z_C$) are parallel to the Cartesian axes ($X_G$, $Y_G$, $Z_G$), respectively. In the Cartesian reference frame 801, the origin $O_C$ is translated with respect to the origin $O_G$ by the vector $A_{OGOC}{}^G$ 841. The components of the vector $R_{OGOC}{}^G(X_{OGOC}{}^G, Y_{OGOC}{}^G, Z_{OGOC}{}^G)$ specify the position (coordinates) of the camera 1000 [more specifically, the position (coordinates) of the optical center $RP_{OC}$ 1011] in the Cartesian reference frame 801.

The orientation of the camera 1000 is specified by three angles: $\theta_C$ 831, $\phi_C$ 833, and $\Omega_C$ 835. The angles $\theta_C$ 831 and $\phi_C$ 833 specify the orientation of the optical axis $Z_A$-axis 1009, where $\theta_C$ 831 is the meridian angle measured from the $Z_C$-axis to the $Z_A$-axis, and the angle $\phi_A$ 833 is the azimuthal angle measured from the $X_C$-axis to the projection of the $Z_A$-axis onto the $X_C$-$Y_C$ plane. The camera 1000 can also rotate about the $Z_A$-axis by the angle $\Omega_C$ 835 (this angle, for example, would be varied to set the camera in the landscape mode or the portrait mode).

Figure 8B:
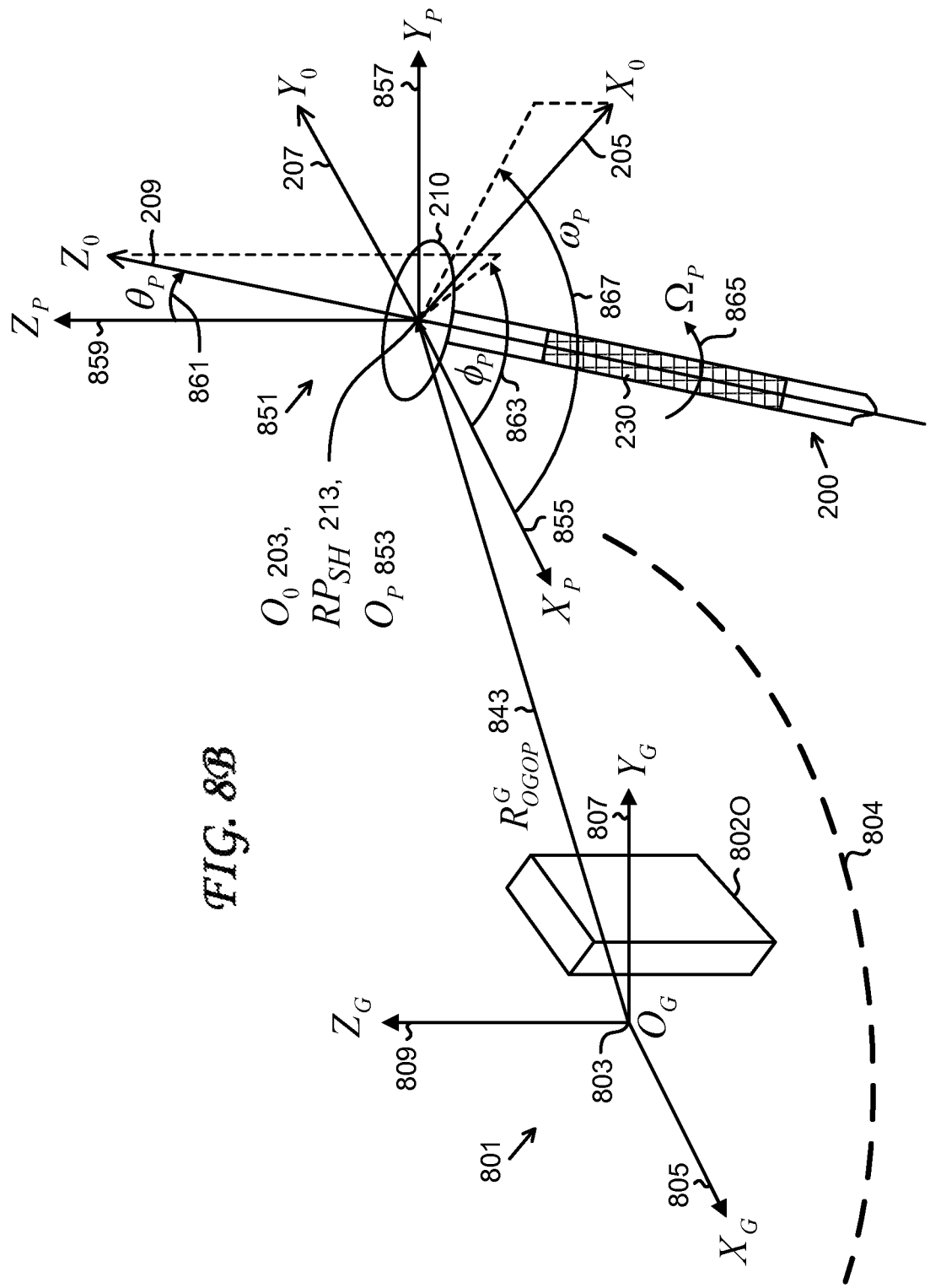

In an embodiment of the invention, the camera position and orientation are determined with a position and orientation sensor. Refer to FIG. 8B. Shown is the top portion of the sensor pole 200 (FIG. 2C). FIG. 8B shows a perspective view of the Cartesian reference frame 851. The Cartesian reference frame 851 is defined by the origin $O_P$ 853, $X_P$-axis 855, $Y_P$-axis 857, and $Z_P$-axis 859. The Cartesian axes ($X_P$,$Y_P$,$Z_P$) are parallel to the Cartesian axes ($X_G$,$Y_G$,$Z_G$), respectively.

Also shown is the Cartesian reference frame 201 fixed to the sensor pole 200 (FIG. 2A), with origin $O_0$ 203, $X_0$-axis 205, $Y_0$-axis 207, and $Z_0$-axis 209; as described earlier, the longitudinal axis of the sensor pole 200 is placed coincident with the $Z_0$-axis 209. The origin $O_P$ is placed coincident with the origin $O_0$, which, as described earlier, is placed coincident with the reference point $RP_{SH}$ 213 (FIG. 2C).

In the Cartesian reference frame 801, the origin $O_P$ is translated with respect to the origin $O_G$ by the vector $R_{OGOP}^D$ 843. The components of the vector $R_{OGOP}^G$ ($X_{OGOP}^G$,$Y_{OGOP}^G$,$Z_{OGOP}^G$) specify the position (coordinates) of the sensor pole 200 [more specifically, the position (coordinates) of the reference point $RP_{SH}$ 213] in the Cartesian reference frame 801.

The orientation of the sensor pole 200 is specified by three angles: $\theta_P$ 861, $\phi_P$ 863, and $\Omega_P$ 865. The angles $\theta_P$ 861 and $\phi_P$ 863 specify the orientation of the longitudinal axis $Z_0$-axis 209, where $\theta_P$ 861 is the meridian angle measured from the $Z_P$-axis to the $Z_0$-axis, and the angle $\phi_P$ 863 is the azimuthal angle measured from the $X_P$-axis to the projection of the $Z_0$-axis onto the $X_P$-$Y_P$ plane.

The sensor pole 200 can also rotate about the $Z_0$-axis by the angle $\Omega_P$ 865. Let the angle $\omega_P$ represent the azimuthal angle measured from the $X_P$-axis to the projection of the $X_0$-axis onto the $X_P$-$Y_P$ plane. Then the angle $\Omega_P$ can be calculated from the angle $\omega_P$.

The position and the orientation of the sensor pole 200 with respect to the Cartesian reference frame 801 can be measured as described above. The position (coordinates) of the reference point $RP_{SH}$ 213 with respect to the origin $O_G$ in the Cartesian reference frame 801 can be measured, for example, with an antenna mounted in the sensor head 210 (the antenna is operably coupled to a GNSS receiver) or with an optical prism mounted in the sensor head 210 (the optical prism is operably coupled to a total station). The meridian angle $\theta_P$ and the azimuthal angle $\phi_P$ can be measured, for example, with two antennas mounted in the sensor head 210 (the two antennas are operably coupled to a GNSS receiver) or with two optical prisms mounted in the sensor head 210 (the two optical prisms are operably coupled to a total station).

The rotation angle $\Omega_P$ can be measured, for example, with an electronic magnetic compass mounted in the sensor head 210; the electronic magnetic compass is used to measure the azimuthal angle $\omega_P$, and $\Omega_P$ is calculated from $\omega_P$, $\theta_P$, and $\phi_P$. The rotation angle $\Omega_P$ can be also measured, for example, with an inertial measurement unit (IMU) mounted in the sensor head 210; the IMU measures changes in $\Omega_P$ from a known initial value of $\Omega_P$.

In an embodiment, the rotation angle $\Omega_P$ is measured with an electronic magnetic compass fine-tuned with an IMU. An electronic magnetic compass has the advantage of determining an absolute reading of $\Omega_P$; however, an electronic magnetic compass has a slow response time and is susceptible to magnetic interference (for example, from passing nearby large machinery or vehicles). An IMU has the advantage of a fast response time and is not susceptible to magnetic interference; however, since it measure changes in $\Omega_P$, the absolute reading of $\Omega_P$ is subject to drift and bias. Therefore, an electronic magnetic compass can be used to establish absolute reference values of $\Omega_P$ at periodic time instants, and an IMU can be used to measure changes in $\Omega_P$ between the periodic time instants.

Figure 8C:
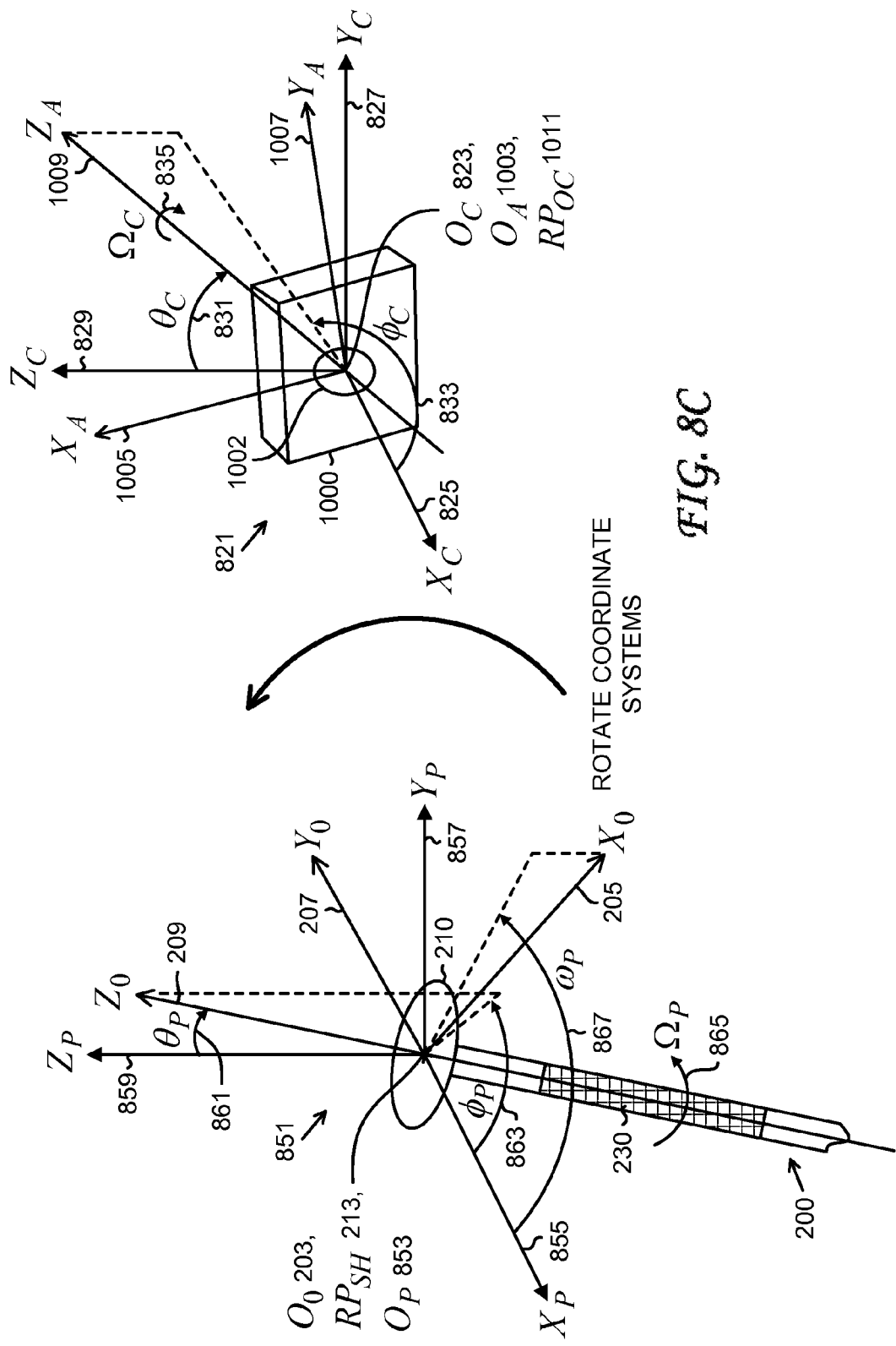

Refer to FIG. 8C, which shows the sensor pole 200 (FIG. 8B) juxtaposed with the camera 1000 (FIG. 8A). The coordinate systems are then transformed by a rotation about the origin $O_0$ 203 such that the longitudinal axis $Z_0$-axis 209 is aligned with the $Z_P$-axis 859. The resulting view is shown in FIG. 8D.

Figure 8D:
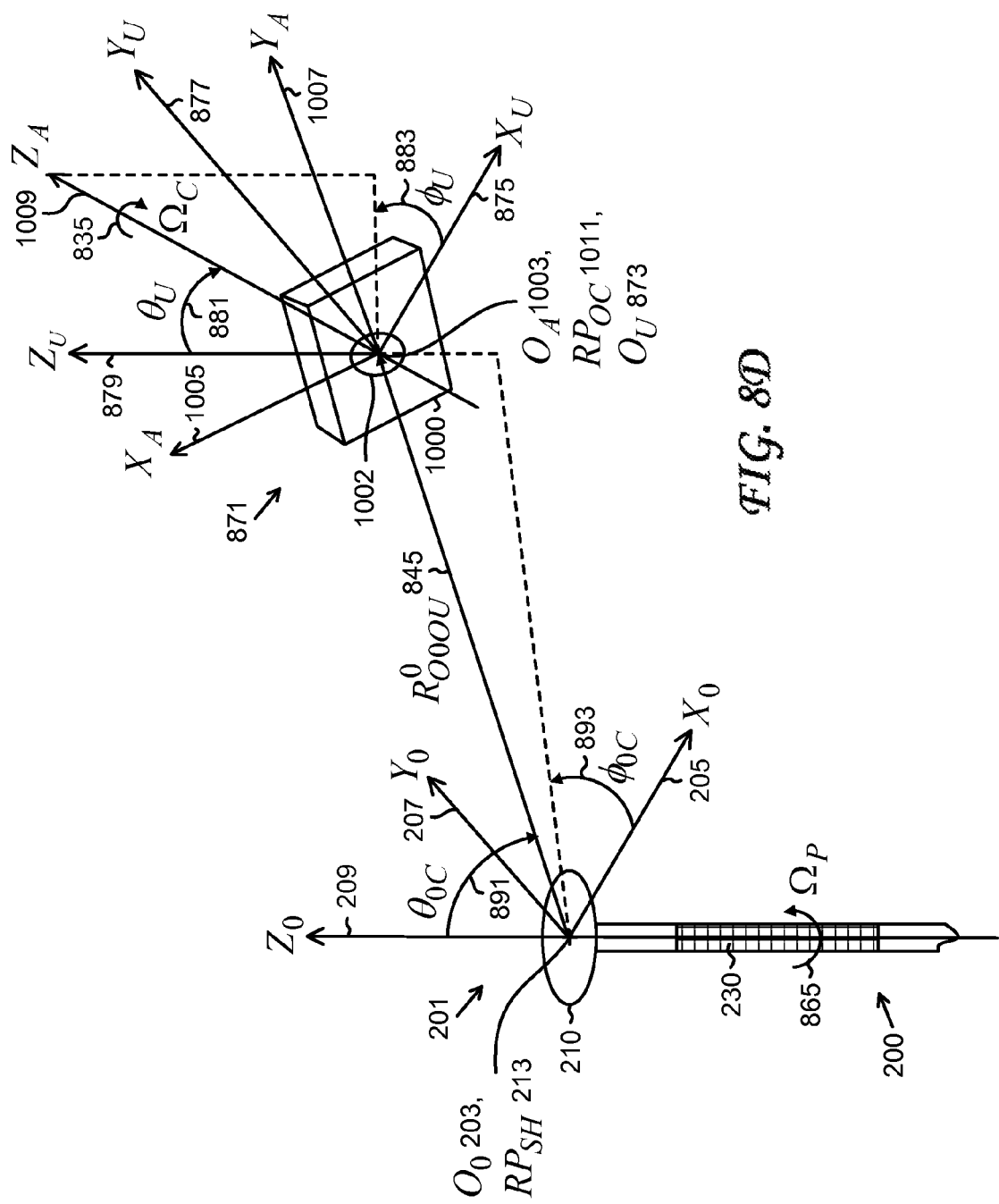

FIG. 8D shows the Cartesian reference coordinate system 871, defined by the origin $O_U$ 873, $X_U$-axis 875, $Y_U$-axis 877, and $Z_U$-axis 879. The origin $O_U$ is placed coincident with the origin $O_A$ 1003 and the optical center $RP_{OC}$ 1011. The Cartesian axes ($X_U$,$Y_U$,$Z_U$) are parallel to the Cartesian axes ($X_0$,$Y_0$,$Z_0$), respectively.

In the Cartesian reference frame 201, the origin $O_U$ is translated with respect to the origin $O_0$ by the vector $R_{O0OU}^0$ 845. The components of the vector $R_{O0OU}^0$ ($X_{O0OU}^0$,$Y_{O0OU}^0$, $Z_{O0OU}^0$) specify the position (coordinates) of the camera 1000 [more specifically, the position (coordinates) of the optical center $RP_{OC}$ 1011] in the Cartesian reference frame 201. The position can also be specified by the spherical coordinates ($R_{OC}$,$\theta_{OC}$,$\phi_{OC}$). Here $R_{OC}=|R_{O0OU}^0|$ is the magnitude of the vector $R_{O0OU}^0$. The angle $\theta_{OC}$ 891 is the meridian angle measured from the $Z_0$-axis to the vector $R_{O0OU}^0$. The angle $\phi_{OC}$ 893 is the azimuthal angle measured from the $X_0$-axis to the projection of the $R_{O0OU}^0$ vector onto the $X_0$-$Y_0$ plane.

The orientation of the camera 1000 is specified by three angles: $\theta_U$ 881, $\phi_U$ 883, and $\Omega_C$ 835. The angles $\theta_U$ 881 and $\phi_U$ 883 specify the orientation of the optical axis $Z_A$-axis 1009, where $\theta_U$ 881 is the meridian angle measured from the $Z_U$-axis to the $Z_A$-axis, and the angle $\phi_U$ 883 is the azimuthal angle measured from the $X_U$-axis to the projection of the $Z_A$-axis onto the $X_U$-$Y_U$ plane. As discussed above, the camera 1000 can also rotate about the $Z_A$-axis by the angle $\Omega_C$ 835.

In an embodiment, the position ($R_{OC}$,$\theta_{OC}$,$\phi_{OC}$) and the orientation ($\theta_U$,$\phi_U$,$\Omega_C$) of the camera are determined by image analysis of a visual image of the optical target 230 captured by the camera 1000.

Figure 13A:
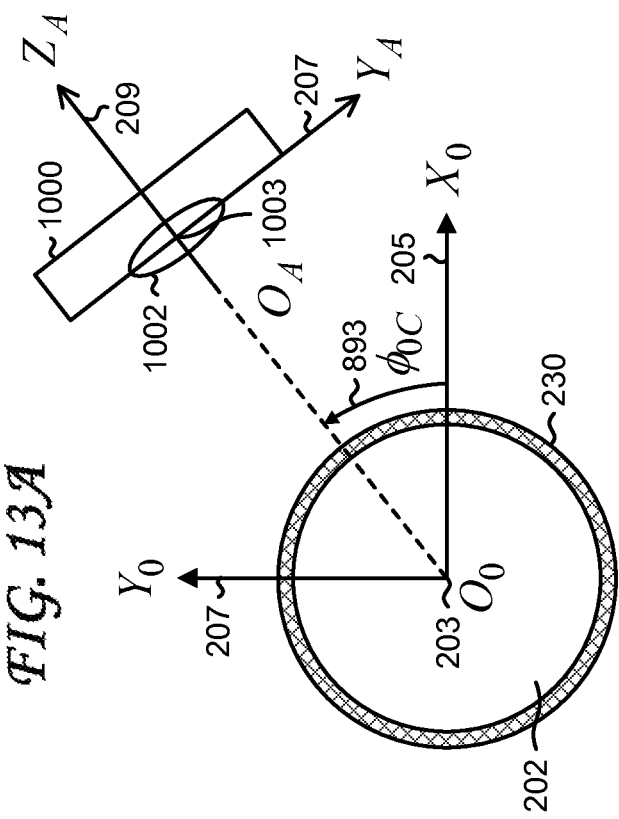
FIG. 13A-FIG. 13C show schematic diagrams of an embodiment of a method for analyzing a visual image of an optical target.

To illustrate the basic principles, first consider a simplified example in which $\theta_{OC}=\pi/2$, $\theta_U=\pi/2$, $\phi_U=\phi_{OC}$, and $\Omega_C$, is set such that the $X_A$-axis is parallel to the $Z_U$-axis. Refer to FIG. 13A, which shows a plan view sighted along the $-Z_0$-axis. Shown is the shaft 202, with the optical target 230. As discussed above with reference to FIG. 2K, the optical target 230 includes features that are mapped to ($Z_0$, $\phi_0$). Therefore the angle $\phi_{OC}$ can be determined from image analysis of the image of the optical target 230 captured by the camera 1000.

Figure 13B:
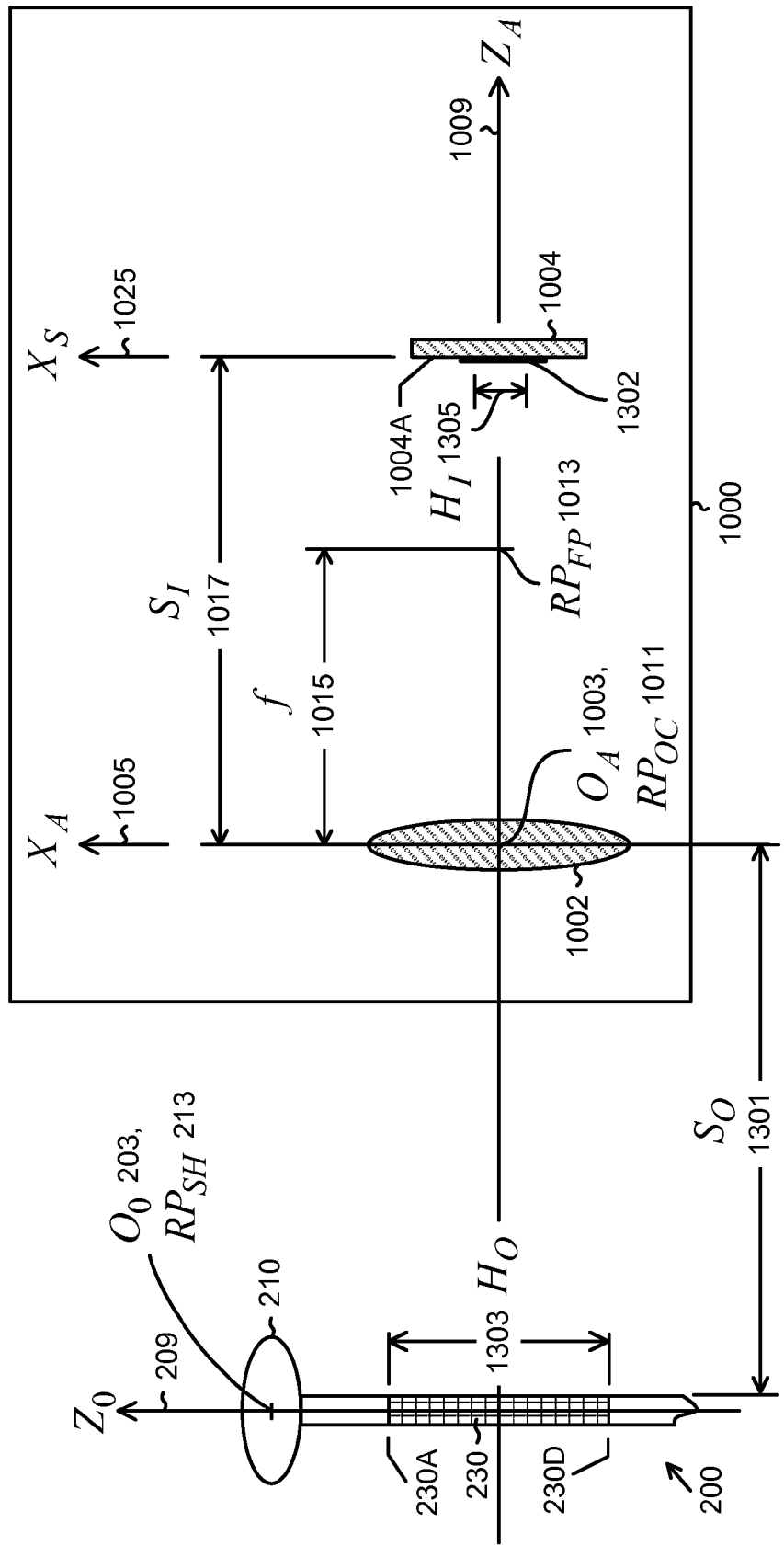

Refer to FIG. 13B, which shows a cross-sectional view of the camera 1000 in the $X_A$-$Z_A$ plane (as previously shown in FIG. 10B) and a view of the sensor pole 200 orthogonal to the $Z_O$-axis. The closest distance between the optical target 230 and the optical center $RP_{OC}$, measured along the optical axis, is the distance $S_O$ 1301; this distance is referred to as the object distance. The height of the optical target 230, measured along the $Z_O$-axis from the top boundary 230A to the bottom boundary 230D, is the height $H_O$ 1303.

The lens 1002 forms an image 1302 (of at least a portion of the sensor pole) on the image plane (front surface 1004A of the image sensor 1004). The corresponding height of the image of the optical target, measured along the $X_S$-axis, is the height $H_I$ 1305. From geometrical optics, the relationship between $H_O$ and $H_I$ is given by the equations (in the thin-lens approximation):

$$\frac{1}{S_I} + \frac{1}{S_O} = \frac{1}{f} \quad (E1)$$

$$\frac{H_I}{H_O} = \frac{S_I}{S_O}. \quad (E2)$$

The focal length f and the object height $H_O$ are known. The image distance $S_I$ varies as the lens is focussed and is typically not directly measurable during operation of the camera. Therefore, if the image height $H_I$ is measured, then the object distance $S_O$ can be calculated from (E1) and (E2).

Figure 13C:
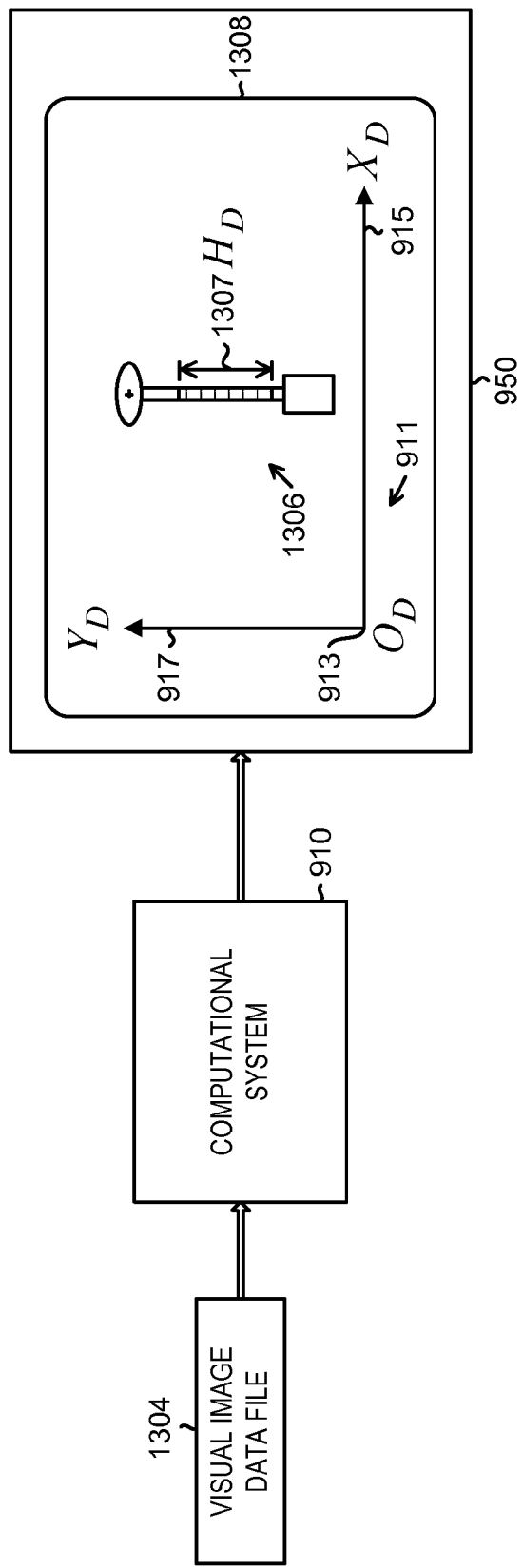

As discussed above, the visual image captured by the camera 1000 is represented by data stored in a data file. The data file is then processed by a computational system and displayed on a display. Refer to FIG. 13C. The image 1302 is stored as data in the visual image data file 1304 and displayed as the image 1306 in the display 950. The corresponding height of the image of the optical target, measured along the $Y_D$-axis, is the height $H_D$ 1307. The ratio of $H_D$ to $H_I$ is given by the display scaling factor $M_{DI}$:

$$\frac{H_D}{H_I} = M_{DI}. \quad (E3)$$

Figure 9C:
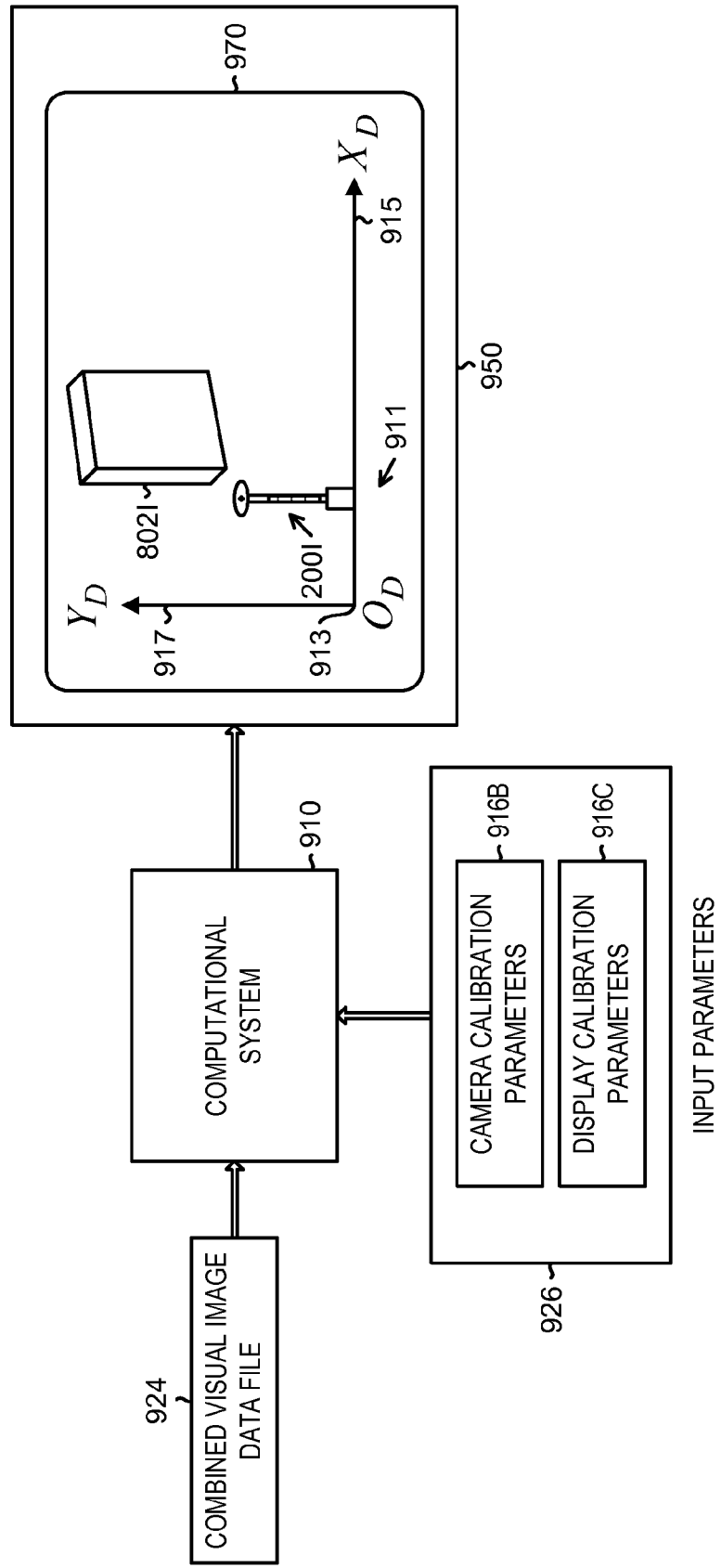

For a specific combination of camera, computational system, and display, the display scaling factor $M_{DI}$ can be determined by measuring values of $H_D$ and $H_I$. Different samples of $H_D$ and $H_I$ can be measured. The values of $M_{DI}$ can be averaged and stored (a weighted average can be used). The display scaling factor is a key parameter in the display calibration parameters 916C (FIG. 9B and FIG. 9C).

From (E1)-(E3), the object distance $S_O$ is then calculated from the equation:

$$S_O = f\left[1 + M_{DI}\left(\frac{H_O}{H_D}\right)\right]. \quad (E4)$$

More complex photogrammetry algorithms can be similarly used for multi-element lenses and for scenarios in which the camera orientation is arbitrary. Since the optical target comprises a set of characteristic features, the object distance and the camera orientation are not calculated from a single value; they can be calculated from a set of values and averaged for greater accuracy (weighted averages can be used). For example, in the simplified example above, only the single object height $H_O$ was used to characterize the height of the optical target; in practice, the spacings measured along the $Z_O$-axis between multiple pairs of characteristic features can be used. The optical target can also be configured to provide characteristic features of different resolution. For example, a coarse set of characteristic features can allow the algorithms to identify the azimuthal angle $\phi_O$ to, for example, the nearest 5 deg increment; and a fine set of characteristic features disposed about each coarse characteristic feature can allow the algorithms to identify the azimuthal angle to, for example, the nearest 0.5 deg increment.

Alternatively, a digital model of the optical target can be created, and virtual images of the optical target can be generated for different object distances and different camera orientations. The set of virtual images of the optical target can be stored in a data set. By comparing the current visual image of the optical target captured with a camera with the set of virtual images of the optical target, the best-match virtual image of the optical target can be obtained, and the best-match values of object distance and camera orientation can be obtained. For the scenarios previously shown in FIG. 3A and FIG. 3B, the range of object distance and camera orientation will be limited by the size and movement of typical operators; therefore, the search space (number of virtual images) can be restricted.

Alternatively still, calibration can be performed by capturing a set of reference visual images of the optical target over a set of known object distances and a set of known camera orientations. The set of reference visual images can be stored in a data set. By comparing the current visual image of the optical target with the set of reference visual images of the optical target, the best-match reference visual image of the optical target can be obtained, and the best-match values of object distance and camera orientation can be obtained. For the scenarios previously shown in FIG. 3A and FIG. 3B, the range of object distance and camera orientation will be limited by the size and movement of typical operators; therefore, the search space (number of reference visual images) can be restricted.

In summary, by analyzing the visual image of at least a portion of the optical target, the position and orientation of the camera relative to the sensor pole can be calculated. Since the position and orientation of the sensor pole relative to the site reference frame are known through measurements, the position and orientation of the camera relative to the site reference frame can then be calculated.

In various figures, a visual image of a sensor pole (or at least a portion of a sensor pole containing at least a portion of an optical target) is shown for convenience of explanation. In some embodiments, a visual image of a sensor pole is displayed on a display as a visual cue to the operator. Image analysis to identify at least a portion of the optical target and to determine the position and the orientation of the camera relative to the sensor pole, however, does not require a visual image of at least a portion of the optical target to be actually displayed on a display: such image analysis can be performed digitally from the data representing the visual image of at least a portion of the optical target.

Refer to FIG. 9C. The computational system 910 receives the combined visual image data file 924 and the input parameters 926. The computational system 910 processes the combined visual image data file 924 and generates the display image 970 on the display 950. The visual image 802I is a visual image of the object 802O (FIG. 8A); and the visual image 200I is a visual image of a portion of the sensor pole 200 (FIG. 2C). The computational system 910 analyzes the visual image 200I and calculates the camera position and orientation.

The display image 970 can display all of the combined visual image stored in the combined visual image data file 924; or the display image 970 can display a portion of the combined visual image stored in the combined visual image data file 924. For example, the computational system 910 can crop, scale, and rotate the combined visual image; these image processing operations are dependent on the display calibration parameters 916C. The visual image 200I can correspond to the visual image (of a portion of the sensor pole) stored in the combined visual image data file 924 or to a portion of the visual image (of a portion of the sensor pole) stored in the combined visual image data file 924.

Figure 9D:
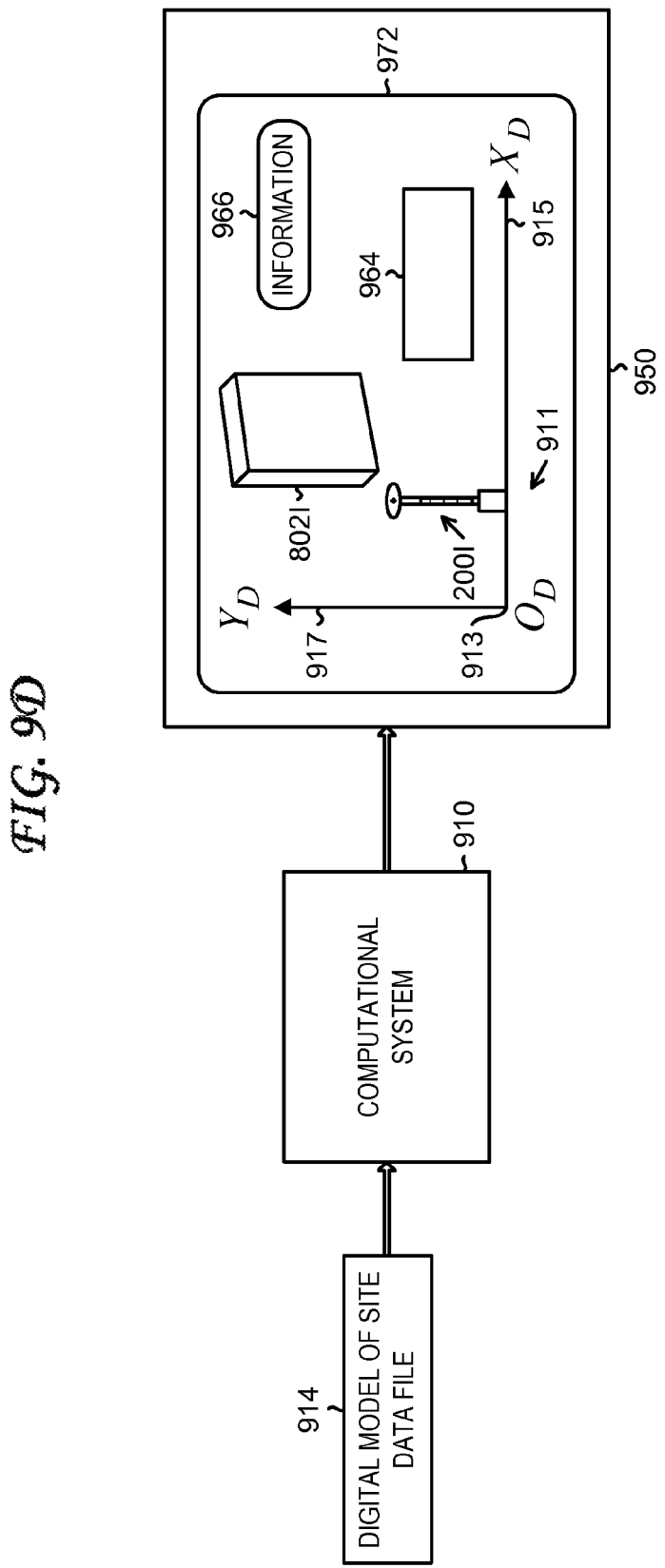

Refer to FIG. 9D. The computational system 910 receives the data file 914, which includes a digital model of the site. Using the previously received camera calibration parameters 916B, the previously received display calibration parameters 916C, and the previously calculated camera position and orientation, the computational system 910 generates, from the digital model of the site, a virtual image 964 and associated information 966, which are superimposed on the display image 970 (FIG. 9C) to generate the display image 972. The display image 972 is an augmented image.

Figure 9E:
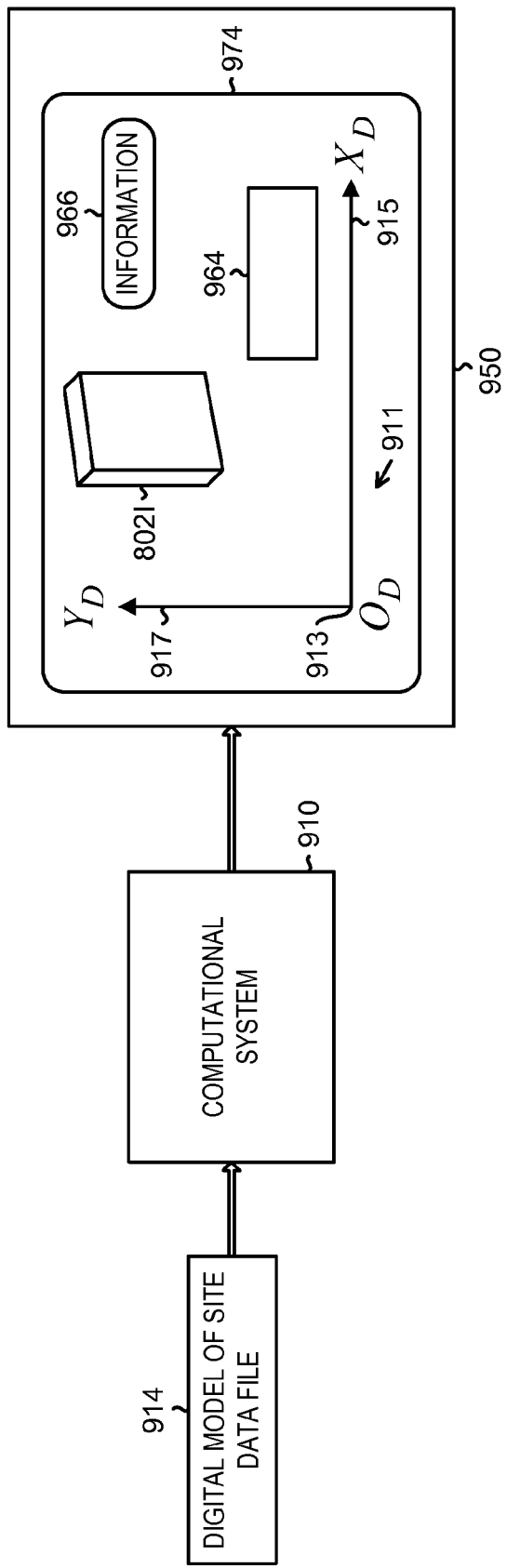

Refer to FIG. 9E. In an embodiment, the image 200I (the visual image of a portion of the sensor pole 200) is removed from the augmented image to simplify the final augmented image, referenced as the display image 974.

Figure 11:
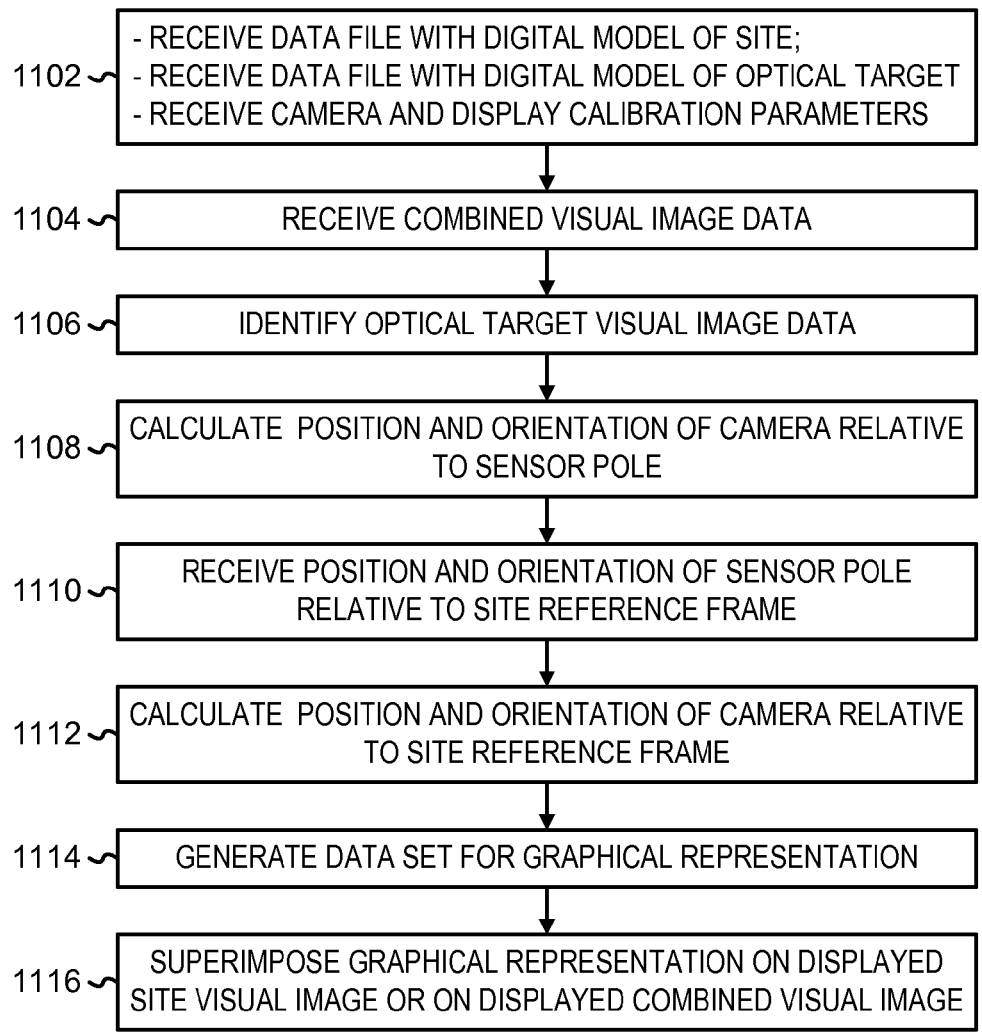
FIG. 11 shows a flowchart of an embodiment of a method for generating an augmented image.

FIG. 11 shows a flowchart summarizing an embodiment of a method for generating an augmented image. The method is performed by a computational system, such as the computational system 500, the computational system 910, or the combination of the computational system 400 and the computational system 460.

In step 1102, the following initial input is received: a data file with a digital model of a site, a data file with a digital model of the optical target, and a set of camera and display calibration parameters.

The process then passes to step 1104, in which combined visual image data representing a combined visual image is received. The combined visual image includes a site visual image of a site and an optical target visual image of at least a portion of an optical target on a sensor pole. The combined visual image data includes site visual image data representing the site visual image and optical target visual image data representing the optical target visual image. The combined visual image data can be received as a combined image data file. The combined image data file can represent a single image captured with a still camera or a single videoframe captured with a videocamera.

The process then passes to step 1106, in which analysis of the combined visual image data is performed to identify the optical target visual image data. The characteristic features of the optical target are known from the digital model of the optical target, and image recognition algorithms are executed to identify the optical target visual image data. As discussed above, the combined visual image does not need to be displayed on a display for the image recognition algorithms to be executed. In some embodiments, as a visual cue to the operator, the combined visual image is displayed on a display.

The process then passes to step 1108, in which the optical target visual image data is analyzed to calculate the position and orientation of the camera relative to the sensor pole.

The process then passes to step 1110, in which the position and orientation of the sensor pole relative to the site reference frame are received.

The process then passes to step 1112, in which the position and orientation of the camera relative to the site reference frame are calculated from the position and orientation of the camera relative to the sensor pole and the position and orientation of the sensor pole relative to the site reference frame.

The process then passes to step 1114, in which a data set for a graphical representation is generated. A graphical representation includes a virtual image associated with the site, information associated with the site, or information associated with the virtual image.

The process then passes to step 1116, in which the graphical representation is superimposed on a displayed site visual image displaying at least a portion of the site visual image or superimposed on a displayed combined visual image displaying at least a portion of the site visual image and at least a portion of the optical target visual image.

As discussed above, stereoscopic augmented images can be generated. In an embodiment, a stereoscopic camera includes two single-view cameras operably coupled such that the position and orientation of the second camera relative to the first camera are known. Since the position and orientation of the second camera relative to the first camera are known, the method discussed above for determining the position and orientation of a camera relative to the site reference frame needs to be performed for only one camera; for example, the first camera. Once the position and orientation of the first camera relative to the site reference frame has been calculated, the position and orientation of the second camera relative to the site reference frame can be calculated from the position and orientation of the first camera relative to the site reference frame and from the position and orientation of the second camera relative to the first camera.

A first augmented image can be generated from a combined visual image (of the site and at least a portion of the optical target on the sensor pole) captured by the first camera; and a second augmented image can be generated from a visual image (of the site or of the site and at least a portion of the optical target on the sensor pole) captured by the second camera.

FIG. 12A and FIG. 12B show schematic diagrams of an embodiment of a stereoscopic camera, referenced as the stereoscopic camera 1230. The stereoscopic camera 1230 includes a mounting plate 1220. Fixed to the mounting plate 1220 is the Cartesian reference frame 1221 defined by the origin $O_{SC}$ 1223, $X_{SC}$-axis 1225, $Y_{SC}$-axis 1227, and $Z_{SC}$-axis 1229. In FIG. 12A, the stereoscopic camera 1230 is viewed along the $-X_{SC}$-axis (top view). In FIG. 12B, the stereoscopic camera 1230 is viewed along the $+Z_{SC}$-axis (front view).

Coupled to the mounting plate 1220 are the camera 1200 (with the lens 1202) and the camera 1210 (with the lens 1212). Fixed to the camera 1200 is the Cartesian reference frame 1201 defined by the origin $O_{A1}$ 1203, $X_{A1}$-axis 1205, $Y_{A1}$-axis 1207, and $Z_{A1}$-axis 1209. The origin $O_{A1}$ is placed coincident with the optical center of the lens 1202, and the $Z_{A1}$-axis is placed coincident with the optical axis of the lens 1202. The $(X_{A1},Y_{A1},Z_{A1})$ axes are parallel to the $(X_{SC},Y_{SC},Z_{SC})$ axes, respectively.

Similarly, fixed to the camera 1210 is the Cartesian reference frame 1211 defined by the origin $O_{A2}$ 1213, $X_{A2}$-axis 1215, $Y_{A2}$-axis 1217, and $Z_{A2}$-axis 1219. The origin $O_{A2}$ is placed coincident with the optical center of the lens 1212, and the $Z_{A2}$-axis is placed coincident with the optical axis of the lens 1212. The $(X_{A2},Y_{A2},Z_{A2})$ axes are parallel to the $(X_{SC},Y_{SC},Z_{SC})$ axes, respectively. The spacing between the optical axis of the lens 1202 and the optical axis of the lens 1212 (measured along the $Y_{SC}$-axis) is $S_{SC}$ 1231. The spacing between the optical axis of each lens and the $Y_{SC}$-axis (measured along the $X_{SC}$-axis) is $H_{SC}$ 1233. Since the position and orientation of the camera 1210 is fixed relative to the camera 1200, if the position and orientation of the camera 1200 relative to the site reference frame are known, then the position and orientation of the camera 1210 relative to the site reference frame can be calculated from the known position and orientation of the camera 1200 relative to the site reference frame and the known position and orientation of the camera 1210 relative to the camera 1200.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for generating an augmented image, the method comprising the steps of:
   receiving combined visual image data representing a combined visual image captured with a digital camera, wherein the combined visual image data comprises:
   site visual image data representing a visual image of a site; and
   optical target visual image data representing a visual image of at least a portion of an optical target disposed on a reference surface of a position and orientation sensor unit;
   identifying, in the combined visual image data, the optical target visual image data;
   calculating, based at least in part on the optical target visual image data, a position and an orientation of the digital camera relative to the position and orientation sensor unit;
   receiving measurements of a position and an orientation of the position and orientation sensor unit relative to a site reference frame;
   calculating, based at least in part on the position and the orientation of the digital camera relative to the position and orientation sensor unit and based at least in part on the position and the orientation of the position and orientation sensor unit relative to the site reference frame, a position and an orientation of the digital camera relative to the site reference frame;
   generating, based at least in part on the position and the orientation of the digital camera relative to the site reference frame and based at least in part on a digital model of the site, at least one graphical representation selected from the group consisting of:
   a virtual image associated with the site;
   information associated with the site; and
   information associated with the virtual image; and
   displaying on a display the at least one graphical representation superimposed on a displayed visual image selected from the group consisting of:
   a displayed site visual image displaying at least a portion of the visual image of the site; and
   a displayed combined visual image displaying at least a portion of the visual image of the site and displaying at least a portion of the visual image of at least a portion of the optical target.

2. The method of claim 1, further comprising the steps of:
   disposing the digital camera such that the site is within a field of view of the digital camera;
   disposing the position and orientation sensor unit such that the at least a portion of the optical target is within the field of view of the digital camera; and
   capturing the combined visual image with the digital camera.

3. The method of claim 1, further comprising the step of:
   displaying on the display the displayed combined visual image, wherein the step of displaying on the display the displayed combined visual image is performed after the step of receiving combined visual image data and before the step of identifying, in the combined visual image data, the optical target visual image data.

4. The method of claim 1, wherein the position and orientation sensor unit comprises at least one sensor and at least one sensor measurement system operably coupled to the at least one sensor, further comprising the step of:
   measuring, with the at least one sensor and with the at least one sensor measurement system, the position and the orientation of the position and orientation sensor unit relative to the site reference frame.

5. The method of claim 4, wherein the at least one sensor and the at least one sensor measurement system operably coupled to the at least one sensor comprises:
   at least one global navigation satellite system antenna and at least one global navigation satellite system receiver operably coupled to the at least one global navigation satellite system antenna; and
   at least one sensor and at least one measurement system operably coupled to the at least one sensor selected from the group consisting of:
   an electronic magnetic compass; and
   an inertial measurement unit.

6. The method of claim 4, wherein the at least one sensor and the at least one sensor measurement system operably coupled to the at least one sensor comprises:
   at least one optical prism and at least one total station operably coupled to the at least one optical prism; and
   at least one sensor and at least one measurement system operably coupled to the at least one sensor selected from the group consisting of:
   an electronic magnetic compass; and
   an inertial measurement unit.

7. The method of claim 1, wherein the digital camera comprises a lens and an image sensor, further comprising the steps of:
   receiving calibration parameters comprising:
   a focal length of the lens; and
   a display scaling factor representing a ratio between an image height on the display and an image height on the image sensor; and
   receiving a digital model of the optical target;
   wherein:
   the step of identifying, in the combined visual image data, the optical target visual image data is based at least in part on the calibration parameters and is based at least in part on the digital model of the optical target;
   the step of calculating, based at least in part on the optical target visual image data, a position and an orientation of the digital camera relative to the position and orientation sensor unit is based at least in part on the calibration parameters and is based at least in part on the digital model of the optical target; and
   the step of generating, based at least in part on the position and the orientation of the digital camera relative to the site reference frame and based at least in part on a digital model of the site, at least one graphical representation selected from the group consisting of:

a virtual image associated with the site;
information associated with the site; and
information associated with the virtual image;
is further based at least in part on the calibration parameters.

8. A system for generating an augmented image, the system comprising:
a digital camera;
a sensor pole comprising:
a sensor head comprising at least one sensor;
a shaft coupled to the sensor head; and
an optical target disposed on a reference surface of the shaft;
at least one sensor measurement system operably coupled to the at least one sensor;
a display; and
a computational system operably coupled to the digital camera, the at least one sensor measurement system, and the display;
wherein:
when the digital camera and the sensor pole are disposed such that a site and at least a portion of the optical target are within a field of view of the digital camera, the digital camera is configured to:
capture a combined visual image, wherein the combined visual image comprises:
a visual image of the site; and
a visual image of the at least a portion of the optical target;
represent the combined visual image as combined visual image data, wherein the combined visual image data comprises:
site visual image data representing the visual image of the site; and
optical target visual image data representing the visual image of the at least a portion of the optical target; and
transmit the combined visual image data;
the at least one sensor and the at least one sensor measurement system are configured to:
measure a position and an orientation of the sensor pole relative to a site reference frame;
represent the position and the orientation of the sensor pole as measurement data; and
transmit the measurement data; and
the computational system is configured to:
receive the combined visual image data;
receive the measurement data;
identify, in the combined visual image data, the optical target visual image data;
calculate, based at least in part on the optical target visual image data, a position and an orientation of the digital camera relative to the sensor pole;
calculate, based at least in part on the position and the orientation of the digital camera relative to the sensor pole and based at least in part on the position and the orientation of the sensor pole relative to the site reference frame, a position and an orientation of the digital camera relative to the site reference frame;
generate, based at least in part on the position and the orientation of the digital camera relative to the site reference frame and based at least in part on a digital model of the site, at least one graphical representation selected from the group consisting of:
a virtual image associated with the site;
information associated with the site; and
information associated with the virtual image; and
display the at least one graphical representation superimposed on a displayed visual image selected from the group consisting of:
a displayed site visual image displaying at least a portion of the visual image of the site; and
a displayed combined visual image displaying at least a portion of the visual image of the site and displaying at least a portion of the visual image of at least a portion of the optical target.

9. The system of claim 8, wherein the at least one sensor and the at least one sensor measurement system operably coupled to the at least one sensor comprises:
at least one global navigation satellite system antenna and at least one global navigation satellite system receiver operably coupled to the at least one global navigation satellite system antenna; and
at least one sensor and at least one measurement system operably coupled to the at least one sensor selected from the group consisting of:
an electronic magnetic compass; and
an inertial measurement unit.

10. The system of claim 8, wherein the at least one sensor and the at least one sensor measurement system operably coupled to the at least one sensor comprises:
at least one optical prism and at least one total station operably coupled to the at least one optical prism; and
at least one sensor and at least one measurement system operably coupled to the at least one sensor selected from the group consisting of:
an electronic magnetic compass; and
an inertial measurement unit.

11. The system of claim 8, wherein:
the digital camera comprises a lens and an image sensor; and
the computational system is further configured to:
receive calibration parameters comprising:
a focal length of the lens; and
a display scaling factor representing a ratio between an image height on the display and an image height on the image sensor;
receive a digital model of the optical target;
identify, in the combined visual image data, the optical target visual image data based at least in part on the calibration parameters and based at least in part on the digital model of the optical target;
calculate the position and the orientation of the digital camera relative to the site reference frame further based at least in part on the calibration parameters and further based at least in part on the digital model of the optical target; and
generate the at least one graphical representation further based at least in part on the calibration parameters.

12. The system of claim 8, wherein the digital camera, the display, and the computational system are integrated into a laptop computer or a tablet computer.

13. The system of claim 8, wherein:
the digital camera, the display, and the computational system are integrated into a head-mounted unit; and
the display is a heads-up display.

14. The system of claim 8, wherein:
the digital camera is mounted on an eyeglass frame;
the display is a heads-up display mounted on the eyeglass frame; and
the computational system comprises a first computational system and a second computational system, wherein:
the first computational system is mounted on the eyeglass frame;

the second computational system is not mounted on the eyeglass frame;

the first computational system and the second computational system are operably coupled; and the first computational system is operably coupled to the digital camera and to the display.

15. The system of claim 8, wherein:

the shaft is a survey pole having a cylindrical surface; and the optical target is disposed on at least a portion of the cylindrical surface.

16. An apparatus for generating an augmented image, the apparatus comprising:

at least one processor unit;

memory operably coupled to the at least one processor unit;

a display operably coupled to the at least one processor unit; and at least one data storage device operably coupled to the at least one processor unit, wherein the at least one data storage device stores computer program instructions which, when executed by the at least one processor unit, causes the at least one processor unit to perform the method comprising the steps of:

receiving combined visual image data representing a combined visual image captured with a digital camera, wherein the combined visual image data comprises:

site visual image data representing a visual image of a site; and optical target visual image data representing a visual image of at least a portion of an optical target disposed on a reference surface of a position and orientation sensor unit;

identifying, in the combined visual image data, the optical target visual image data;

calculating, based at least in part on the optical target visual image data, a position and an orientation of the digital camera relative to the position and orientation sensor unit;

receiving measurements of a position and an orientation of the position and orientation sensor unit relative to a site reference frame;

calculating, based at least in part on the position and the orientation of the digital camera relative to the position and orientation sensor unit and based at least in part on the position and the orientation of the position and orientation sensor unit relative to the site reference frame, a position and an orientation of the digital camera relative to the site reference frame;

generating, based at least in part on the position and the orientation of the digital camera relative to the site reference frame and based at least in part on a digital model of the site, at least one graphical representation selected from the group consisting of:

a virtual image associated with the site;

information associated with the site; and information associated with the virtual image; and displaying on the display the at least one graphical representation superimposed on a displayed visual image selected from the group consisting of:

a displayed site visual image displaying at least a portion of the visual image of the site; and a displayed combined visual image displaying at least a portion of the visual image of the site and displaying at least a portion of the visual image of the at least a portion of the optical target.

17. The apparatus of claim 16, wherein the method further comprises the step of:

displaying on the display the displayed combined visual image, wherein the step of displaying on the display the displayed combined visual image is performed after the step of receiving combined visual image data and before the step of identifying, in the combined visual image data, the optical target visual image data.

18. The apparatus of claim 16, wherein the position and orientation sensor unit comprises at least one sensor and at least one sensor measurement system operably coupled to the at least one sensor.

19. The apparatus of claim 18, wherein the at least one sensor and the at least one sensor measurement system operably coupled to the at least one sensor comprises:

at least one global navigation satellite system antenna and at least one global navigation satellite system receiver operably coupled to the at least one global navigation satellite system antenna; and at least one sensor and at least one measurement system operably coupled to the at least one sensor selected from the group consisting of:

an electronic magnetic compass; and an inertial measurement unit.

20. The apparatus of claim 18, wherein the at least one sensor and the at least one sensor measurement system operably coupled to the at least one sensor comprises:

at least one optical prism and at least one total station operably coupled to the at least one optical prism; and at least one sensor and at least one measurement system operably coupled to the at least one sensor selected from the group consisting of:

an electronic magnetic compass; and an inertial measurement unit.

21. The apparatus of claim 16, wherein the digital camera comprises a lens and an image sensor, and wherein the method further comprises the steps of:

receiving calibration parameters comprising:

a focal length of the lens; and a display scaling factor representing a ratio between an image height on the display and an image height on the image sensor; and receiving a digital model of the optical target;

wherein:

the step of identifying, in the combined visual image data, the optical target visual image data is based at least in part on the calibration parameters and is based at least in part on the digital model of the optical target;

the step of calculating, based at least in part on the optical target visual image data, a position and an orientation of the digital camera relative to the position and orientation sensor unit is based at least in part on the calibration parameters and is based at least in part on the digital model of the optical target; and the step of generating, based at least in part on the position and the orientation of the digital camera relative to the site reference frame and based at least in part on a digital model of the site, at least one graphical representation selected from the group consisting of:

a virtual image associated with the site;

information associated with the site; and information associated with the virtual image;

is further based at least in part on the calibration parameters.

* * * * *